(12) United States Patent
Dernoncourt et al.

(10) Patent No.: US 11,232,255 B2
(45) Date of Patent: Jan. 25, 2022

(54) GENERATING DIGITAL ANNOTATIONS FOR EVALUATING AND TRAINING AUTOMATIC ELECTRONIC DOCUMENT ANNOTATION MODELS

(71) Applicant: Adobe Inc., San Jose, CA (US)

(72) Inventors: Franck Dernoncourt, Sunnyvale, CA (US); Walter Chang, San Jose, CA (US); Trung Bui, San Jose, CA (US); Sean Fitzgerald, San Jose, CA (US); Sasha Spala, Boston, MA (US); Kishore Aradhya, Boston, MA (US); Carl Dockhorn, San Jose, CA (US)

(73) Assignee: Adobe Inc., San Jose, CA (US)

( * ) Notice: Subject to any disclaimer, the term of this patent is extended or adjusted under 35 U.S.C. 154(b) by 56 days.

(21) Appl. No.: 16/007,632

(22) Filed: Jun. 13, 2018

(65) Prior Publication Data

US 2019/0384807 A1    Dec. 19, 2019

(51) Int. Cl.
*G06F 40/169*    (2020.01)
(52) U.S. Cl.
CPC .................................. *G06F 40/169* (2020.01)
(58) Field of Classification Search
CPC ..... G06F 17/241; G06F 40/169; G06N 20/00; G06N 20/10
See application file for complete search history.

(56) References Cited

U.S. PATENT DOCUMENTS

| 6,018,619 | A | * | 1/2000 | Allard | H04L 29/06 |
| | | | | | 709/211 |
| 6,037,935 | A | * | 3/2000 | Bates | G06F 16/9558 |
| | | | | | 715/760 |
| 8,165,974 | B2 | * | 4/2012 | Privault | G06Q 50/18 |
| | | | | | 706/12 |

(Continued)

OTHER PUBLICATIONS

Rzeszotarski, Jeffrey M. et al. "Instrumenting the Crowd: Using Implicit Behavioral Measures to Predict Task Performance". <https://dl.acm.org/doi/10.1145/2047196.2047199> (Year: 2011).*

(Continued)

*Primary Examiner* — Kavita Stanley
*Assistant Examiner* — Tyler Schallhorn
(74) *Attorney, Agent, or Firm* — Keller Jolley Preece

(57) ABSTRACT

Systems, methods, and non-transitory computer-readable media are disclosed that collect and analyze annotation performance data to generate digital annotations for evaluating and training automatic electronic document annotation models. In particular, in one or more embodiments, the disclosed systems provide electronic documents to annotators based on annotator topic preferences. The disclosed systems then identify digital annotations and annotation performance data such as a time period spent by an annotator in generating digital annotations and annotator responses to digital annotation questions. Furthermore, in one or more embodiments, the disclosed systems utilize the identified digital annotations and the annotation performance data to generate a final set of reliable digital annotations. Addition- (Continued)

ally, in one or more embodiments, the disclosed systems provide the final set of digital annotations for utilization in training a machine learning model to generate annotations for electronic documents.

20 Claims, 22 Drawing Sheets

(56) References Cited

U.S. PATENT DOCUMENTS

| | | | | |
|---|---|---|---|---|
| 8,379,053 | B1* | 2/2013 | Phillips | G06Q 30/02 345/619 |
| 8,392,553 | B2* | 3/2013 | Petropoulakis | G06F 11/3089 709/224 |
| 8,554,605 | B2* | 10/2013 | Oleson | G06Q 10/06311 705/7.41 |
| 8,626,545 | B2* | 1/2014 | Van Pelt | G06Q 10/06398 705/7.13 |
| 8,635,520 | B2* | 1/2014 | Christiansen | G06F 17/241 715/230 |
| 8,700,464 | B1* | 4/2014 | McAllister | G06Q 30/0244 705/14.43 |
| 8,706,729 | B2* | 4/2014 | Welinder | G06Q 10/101 707/736 |
| 8,914,496 | B1* | 12/2014 | Richardson | H04L 43/08 709/224 |
| 9,305,263 | B2* | 4/2016 | Horvitz | G06N 5/043 |
| 9,355,360 | B2* | 5/2016 | Welinder | G06N 5/048 |
| 9,536,443 | B2* | 1/2017 | Haverlock | G09B 7/02 |
| 9,536,444 | B2* | 1/2017 | Haverlock | G09B 7/02 |
| 9,696,896 | B2* | 7/2017 | Dubey | G06F 3/0485 |
| 9,756,140 | B2* | 9/2017 | Richardson | H04L 67/025 |
| 9,767,419 | B2* | 9/2017 | Venanzi | G06Q 10/06311 |
| 9,792,532 | B2* | 10/2017 | Cox | G06K 9/00288 |
| 9,858,173 | B2* | 1/2018 | Thiruvillamalai | G06F 11/3672 |
| 9,858,267 | B2* | 1/2018 | Makino | G06F 16/24573 |
| 9,860,308 | B2* | 1/2018 | Berajawala | G06F 17/241 |
| 9,912,768 | B1* | 3/2018 | Choi | H04L 67/02 |
| 9,984,050 | B2* | 5/2018 | O'Keeffe | G06F 17/2247 |
| 10,062,011 | B2* | 8/2018 | Cox | G06K 9/00288 |
| 10,262,043 | B2* | 4/2019 | Komedani | G06F 17/241 |
| 10,303,982 | B2* | 5/2019 | Cox | G06K 9/00288 |
| 10,757,167 | B2* | 8/2020 | Choi | H04L 43/045 |
| 10,824,682 | B2* | 11/2020 | Alvares | G06Q 30/02 |
| 2003/0231196 | A1* | 12/2003 | Keohane | G06F 3/04855 715/700 |
| 2006/0038015 | A1* | 2/2006 | Ise | G06Q 30/02 235/462.1 |
| 2006/0154228 | A1* | 7/2006 | Schrab | G09B 5/00 434/365 |
| 2007/0055766 | A1* | 3/2007 | Petropoulakis | G06F 11/3089 709/224 |
| 2010/0262659 | A1* | 10/2010 | Christiansen | G06F 17/241 709/205 |
| 2010/0278453 | A1* | 11/2010 | King | G06F 40/169 382/321 |
| 2010/0312725 | A1* | 12/2010 | Privault | G06Q 10/10 706/12 |
| 2012/0005131 | A1* | 1/2012 | Horvitz | G06N 5/043 706/11 |
| 2012/0198372 | A1* | 8/2012 | Kuhlke | G06F 3/01 715/767 |
| 2013/0006717 | A1* | 1/2013 | Oleson | G06Q 10/06311 705/7.41 |
| 2013/0096968 | A1* | 4/2013 | Van Pelt | G06Q 10/063112 705/7.13 |
| 2013/0097164 | A1* | 4/2013 | Welinder | G06Q 10/101 707/736 |
| 2013/0346409 | A1* | 12/2013 | Welinder | G06N 5/048 707/737 |
| 2014/0013250 | A1* | 1/2014 | Dubey | G06F 3/0485 715/760 |
| 2014/0280890 | A1* | 9/2014 | Yi | H04L 67/22 709/224 |
| 2014/0281877 | A1* | 9/2014 | Burge | G06F 16/958 715/230 |
| 2015/0213360 | A1* | 7/2015 | Venanzi | G06Q 10/06311 706/12 |
| 2015/0293907 | A1* | 10/2015 | Makino | G06F 16/24573 704/9 |
| 2015/0310755 | A1* | 10/2015 | Haverlock | G09B 7/02 434/350 |
| 2015/0356062 | A1* | 12/2015 | De Paula | G06F 3/0484 715/719 |
| 2016/0147399 | A1* | 5/2016 | Berajawala | G06F 17/241 715/753 |
| 2016/0148077 | A1* | 5/2016 | Cox | G06K 9/00288 382/159 |
| 2016/0162457 | A1* | 6/2016 | Munro | G06F 3/0482 715/230 |
| 2016/0162464 | A1* | 6/2016 | Munro | G06F 16/285 704/9 |
| 2016/0180732 | A1* | 6/2016 | Haverlock | G09B 7/02 434/350 |
| 2017/0154015 | A1* | 6/2017 | O'Keeffe | G06F 17/2247 |
| 2017/0258382 | A1* | 9/2017 | Dagum | A61B 5/16 |
| 2017/0316014 | A1* | 11/2017 | Komedani | G06F 17/241 |
| 2018/0012106 | A1* | 1/2018 | Cox | G06K 9/00288 |
| 2018/0144283 | A1* | 5/2018 | Freitas | G06Q 10/06398 |
| 2018/0167438 | A1* | 6/2018 | Choi | H04L 67/22 |
| 2018/0357515 | A1* | 12/2018 | Cox | G06K 9/00288 |
| 2018/0365710 | A1* | 12/2018 | Halecky | G06F 16/35 |
| 2019/0042953 | A1* | 2/2019 | Duesterwald | G06K 9/6254 |
| 2019/0114556 | A1* | 4/2019 | Ye | G06N 7/005 |
| 2019/0164016 | A1* | 5/2019 | Allen | G06N 20/00 |
| 2019/0179883 | A1* | 6/2019 | Bao | G16H 50/20 |
| 2019/0236413 | A1* | 8/2019 | Cox | G06K 9/00288 |
| 2019/0311024 | A1* | 10/2019 | Munro | G06F 3/0482 |
| 2020/0065623 | A1* | 2/2020 | Kao | G06K 9/6227 |
| 2020/0065706 | A1* | 2/2020 | Kao | G06T 11/20 |
| 2020/0184146 | A1* | 6/2020 | Munro | G06F 16/285 |
| 2020/0234002 | A1* | 7/2020 | Munro | G06F 16/951 |
| 2020/0351325 | A1* | 11/2020 | Choi | G06Q 30/0246 |

OTHER PUBLICATIONS

Mok, Ricky K. P. et al. "Detecting low-quality crowdtesting workers", <https://ieeexplore.ieee.org/abstract/document/7404734> (Year: 2015).*

Han, Shuguang et al. "Crowdsourcing Human Annotation on Web Page Structure: Infrastructure Design and Behavior-Based Quality Control" <https://dl.acm.org/doi/10.1145/2870649> (Year: 2016).*

Leiva Torres, Luis A. et al. "A Gesture Inference Methodology for User Evaluation Based on Mouse Activity Tracking", 2008 IADIS. <http://www.iadisportal.org/digital-library/a-gesture-inference-methodology-for-user-evaluation-based-on-mouse-activity-tracking> (Year: 2008).*

Leiva, Luis A. et al. "Web browsing behavior analysis and interactive hypervideo", Nov. 1, 2013 ACM. <https://doi.org/10.1145/2529995.2529996> (Year: 2013).*

Dennis Baron. 2009. A better pencil: Readers, writers, and the digital revolution. Oxford University Press.

Hal Daume III and Daniel Marcu. 2004. Generic sentence fusion is an ill-defined summarization task. In Text Summarization Branches Out Workshop at ACL.

Mohamed Elhoseiny, Scott Cohen, Walter Chang, Brian Price, and Ahmed Elgammal. 2016. Automatic annotation of structured facts in images. In Proceedings of the 5th Workshop on Vision and Language.

Robert L. Fowler and Anne S. Barker. 1974. Effectiveness of highlighting for retention of text material. Journal of Applied Psychology, 59(3):358-364.

Krippendorff, K. (2011). Computing Krippendorff's Alpha-Reliability. Retrieved from http://repository.upenn.edu/asc_papers/43.

R. F. Lorch Jr. 1989. Text-signaling devices and their effects on reading and memory processes. Educational Psychology Review, 1(3):209-234.

(56) References Cited

OTHER PUBLICATIONS

R.F. Lorch Jr, E. Pugzles Lorch, and M.A. Klusewitz. 1995. Effects of typographical cues on reading and recall of text. Contemporary Educational Psychology, 20(1):51-64. (Abstract).

Natwar Modani, Elham Khabiri, Harini Srinivasan, and James Caverlee. 2015. Creating diverse product review summaries: a graph approach. In International Conference on Web Information Systems Engineering—Abstract.

Natwar Modani, Balaji Vasan Srinivasan, and Harsh Jhamtani. 2016. Generating multiple diverse summaries. International Conference on Web Information Systems Engineering. Abstract.

G.J. Rath, A. Resnick, and T.R. Savage. 1961. The formation of abstracts by the selection of sentences, part i. sentence selection by men and machines. Journal of the Association for Information Science and Technology, Abstract.

Pontus Stenetorp, Sampo Pyysalo, Goran Topic, Tomoko Ohta, Sophia Ananiadou, and Junichi Tsujii. 2012. BRAT: a web-based tool for NLP-assisted text annotation. In Proceedings of the Demonstrations at the 13th Conference of the European Chapter of the Association for Computational Linguistics, pp. 102-107. Association for Computational Linguistics.

Amber Stubbs. 2011. MAE and MAI: lightweight annotation and adjudication tools. In Proceedings of the 5th Linguistic Annotation Workshop, pp. 129-133. Association for Computational Linguistics.

DUC 2001 GUIDELINES. Document understanding conference. https://www-nlpir.nist.gov/projects/duc/guidelines/2001.html.

Vicki Gier, David S. Kreiner, and Amelia Natz-Gonzalez. 2009. Harmful effects of preexisting inappropriate highlighting on reading comprehension and metacognitive accuracy. The Journal of General Psychology, 136(3):287-300.

Chin-Yew Lin. 2004. Rouge: a package for automatic evaluation of summaries. In Proceedings of the Workshop on Text Summarization Branches Out, July.

Reinhard W. Lindner et al. 1996. Highlighting text as a study strategy: Beyond attentional focusing. In Annual Meeting of the American Educational Research Association.

H. vonRestorff. 1933. Uberdiewirkungvonbereichsbildungenimspurenfeld. Psychologische Forschung, 18(1):299-342. (Abstract).

* cited by examiner

GENERATING DIGITAL ANNOTATIONS FOR EVALUATING AND TRAINING AUTOMATIC ELECTRONIC DOCUMENT ANNOTATION MODELS

BACKGROUND

Recent years have seen rapid development in the creation, use, and management of electronic documents. Indeed, conventional electronic document management systems can now generate, store, and even annotate electronic documents to assist individuals and businesses in reviewing and utilizing electronic documents. To illustrate, conventional systems can analyze electronic document and automatically apply digital highlights to pertinent portions of the electronic documents to assist reviewers in quickly identifying key points and assimilating pertinent information.

Although conventional electronic document management systems can generate annotated electronic documents, they also have a number of significant shortcomings in relation to accuracy, efficiency, and flexibility. For example, conventional electronic document management systems often fail to accurately annotate key portions of electronic documents. These inaccuracies result partly from errors and limitations of individual annotation models but also from the lack of accurate ground-truth examples (e.g., labeled datasets) for training or testing annotation models. For example, some conventional electronic document management systems attempt to utilize sequential labeling techniques to identify key portions of electronic documents; however, this approach often fails to accurately generate reliable training annotations because of high subjectivity levels amongst reviewers.

In addition, conventional electronic document management systems are oftentimes inefficient. For example, conventional electronic document management systems often require a significant amount of training data (and time) to generate annotation models. Indeed, conventional electronic document management systems oftentimes utilize unreliable training data to test or train annotation models, which increases the time and computational resources to converge on a trained model.

Additionally, conventional electronic document management systems are also rigid and inflexible. For instance, conventional electronic document management systems often rigidly require a set of expert annotators to generate a training data set of key sentences. This approach significantly limits scalability of conventional systems (while increasing expense and time required to implement them).

Furthermore, conventional electronic document management systems also require significant time and resources to navigate and identify information regarding digital annotations. Indeed, conventional electronic document management systems often require users to navigate through a number of different user interfaces and graphical elements to analyze annotations or the efficacy of annotation models. In addition, oftentimes, conventional document management systems do not provide user interfaces that efficiently collect annotations and corresponding information from annotators.

SUMMARY

One or more embodiments described herein provide benefits and/or solve one or more of the foregoing or other problems in the art with systems, methods, and non-transitory computer-readable media that collect and analyze annotation performance data to generate digital annotations for evaluating and training automatic electronic document annotation models. In particular, in one or more embodiments, the disclosed systems utilize a topic extraction technique to present electronic documents of interest to individual annotators and then collect and analyze annotation performance data corresponding to annotators reviewing the electronic documents. For example, the disclosed systems can utilize a question-answering protocol for annotators of an electronic document to quantify the extent to which annotators understood electronic document text. Similarly, the disclosed systems can monitor annotation time, scrolling patterns, or other annotator actions to determine annotation performance data. Moreover, the disclosed systems can utilize the annotation performance data to identify clean annotation datasets (e.g., where texts are labeled or highlighted with key portions) and automatically generate high-quality annotations for creating and assessing automated annotation models (e.g., automated highlighters).

For example, in one or more embodiments, the disclosed systems utilize user topic preferences to provide electronic documents to annotators (e.g., users of computing devices providing crowdsourced annotations for one or more documents). The disclosed systems then can determine digital annotations, such as digital highlights, generated by the annotators for the electronic documents and determine annotation performance data of the annotators (based on interactions of the annotators with the electronic documents). Moreover, in one or more embodiments, the disclosed systems utilize the annotation performance data of the annotators to identify accurate digital annotations. Furthermore, in some embodiments, the disclosed systems provide accurate digital annotations as training data for testing or training an annotation model to automatically generate digital annotations for documents. In this manner, the disclosed systems can generate a training data set of key sentences of documents while reducing computational resources and time and improving the accuracy of training datasets of annotated documents.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
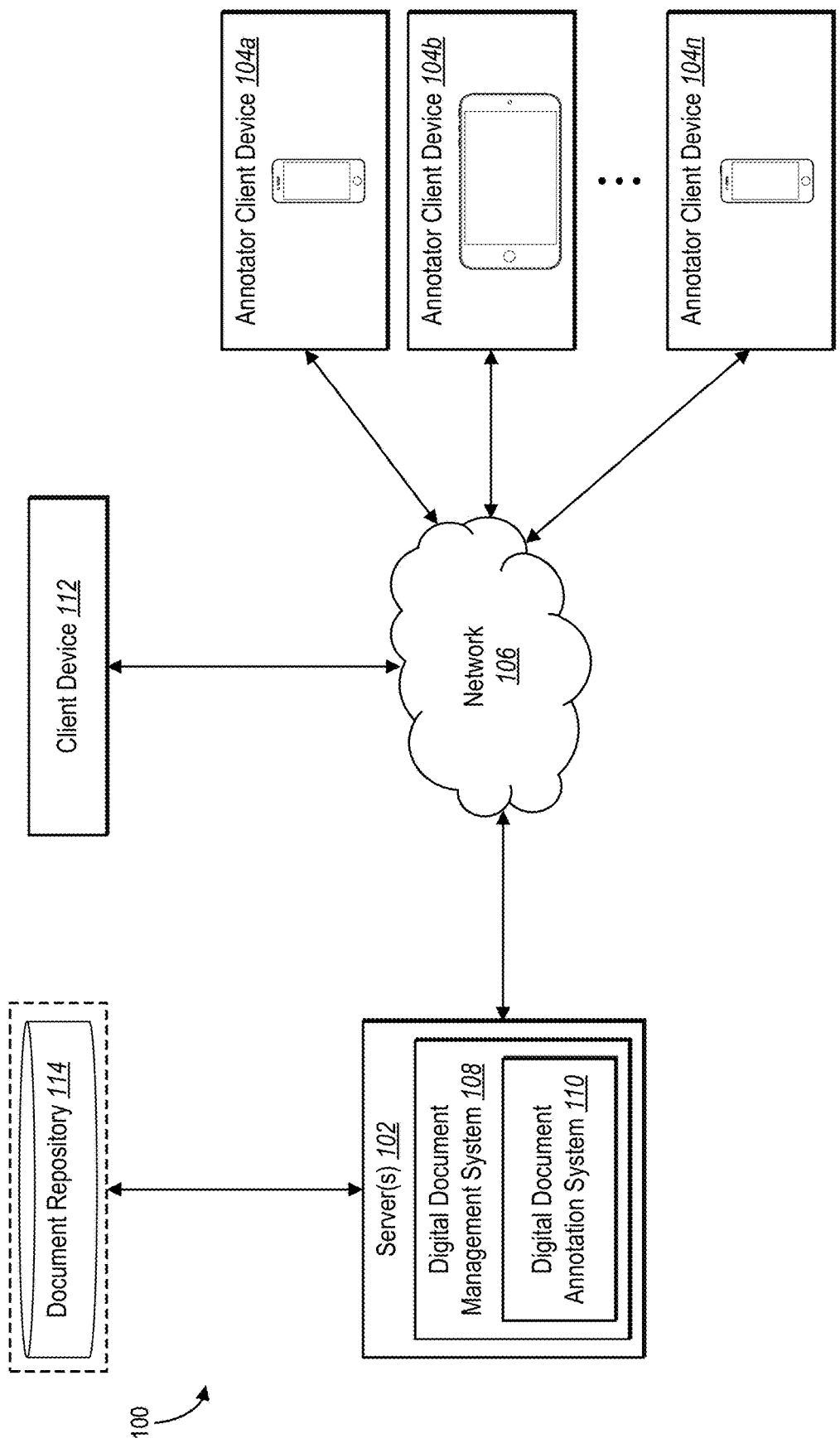
FIG. 1 illustrates a schematic diagram of an exemplary environment in which a digital document annotation system can operate in accordance with one or more embodiments.

One or more embodiments of the present disclosure include a digital document annotation system that identifies and analyzes annotator performance data to generate an accurate set of digital annotations for creating or assessing digital annotation models. In particular, in one or more embodiments, the digital document annotation system identifies digital annotations for an electronic document from annotators. Moreover, the digital document annotation system can determine a set of heuristics based on annotator actions (i.e., annotator performance data) and analyze the set of heuristics to detect accurate (and/or inaccurate) annotators and annotations. For example, the digital document annotation system can determine annotator performance data such as annotator questions, annotator responses, time spent by the annotators, scroll actions of the annotators, cursor movements of the annotators, and/or other annotator actions. Furthermore, the digital document annotation system can then generate digital annotation data for the electronic document by determining the reliability of the digital annotations based on the corresponding annotator performance data. Moreover, the digital document annotation system can then utilize the digital annotation data for training or testing automatic annotation models.

To illustrate, in one or more embodiments, the digital document annotation system provides an electronic document to client devices of annotators based on topic preferences. The digital document annotation system can then detect user interactions of the annotators via the client devices to identify digital annotations for the electronic document. In some embodiments, the digital document annotation system also determines annotator performance data from the user interactions of the annotators on the client devices. The digital document annotation system can then utilize the digital annotations to generate (ground-truth) digital annotation data by utilizing the performance annotator data to determine the reliability of the annotators and their digital annotations. Additionally, in some embodiments, the digital document annotation system can provide the ground-truth digital annotation data to train machine learning models to automatically generate digital annotations from documents or to test an annotation model that automatically generates digital annotations from documents.

As just mentioned, in one or more embodiments, the digital document annotation system provides an electronic document to client devices of annotators based on topic preferences. In particular, the digital document annotation system can analyze user interactions of the annotators to determine document topic preferences for the annotators. Additionally, the digital document annotation system can utilize the determined document topic preferences for the annotators to select electronic documents and provide the electronic documents to the annotators. In this manner, the digital document annotation system can increase annotator engagement and the quality of resulting annotations.

Upon providing an electronic document to the client devices based on the topic preferences, the digital document annotation system can identify digital annotations generated by the annotators. For example, in some embodiments, the digital document annotation system utilizes user interactions of the annotators with the electronic document on client devices to determine digital annotations that are generated for the electronic document. To illustrate, the digital document annotation system can identify digital highlights applied to the electronic document via client devices of individual annotators.

Furthermore, as mentioned above, in one or more embodiments, the digital document annotation system determines annotator performance data based on user interactions of the annotators via client devices. For instance, the digital document annotation system can analyze user interactions of annotators to determine time spent, scroll actions, cursor movements, and/or other annotator actions as annotator performance data. Furthermore, the digital document annotation system can provide questions to annotators and determine annotator performance data from annotator responses. In addition, in one or more embodiments, the digital document annotation system collects question-answer pairs from annotators and identifies annotation performance data from the question-answer pairs.

Upon identifying the digital annotations and annotation performance data, the digital document annotation system can generate accurate digital annotations. For example, the digital document annotation system can utilize the annotation performance data to determine reliable annotators (and corresponding reliable annotations) by comparing the annotation performance data with threshold performance metrics. For instance, the digital document annotation system can compare time spent by annotators to review time thresholds. Similarly, the digital document annotation system can compare annotator response to response thresholds. In this manner, the digital document annotation system can determine reliability of annotators and corresponding annotations. The digital document annotation system can then utilize the digital annotations generated by reliable annotators as ground-truth annotation data.

As mentioned above, in one or more embodiments, the digital document annotation system provides a ground-truth annotation data set to train a machine learning model to automatically generate digital annotations from documents or to test an annotation model that automatically generates digital annotations from documents. For instance, the digital document annotation system can train a machine learning model to automatically generate digital annotations for an electronic document by utilizing the machine learning model to generate predicted digital annotations and comparing the predicted digital annotations with the ground-truth annotation data set. Additionally, the digital document annotation system can test an annotation model by comparing digital annotations generated by the annotation model with the ground-truth annotation data set to determine the accuracy of the annotation model.

The digital document annotation system can provide several advantages over conventional systems. For example, the digital document annotation system can improve accuracy in generating reliable ground-truth data sets that include digital annotations of key sentences of documents. By utilizing annotation performance data to determine the reliability of annotators and digital annotations for electronic documents, the digital document annotation system can determine reliable annotations of key sentences of electronic documents (even where identifying key sentences of the electronic documents have a high level of subjectivity). Moreover, the digital document annotation system can more accurately train and/or test annotation models to automatically generate digital annotations for electronic documents. In addition, by automatically identifying and using electronic documents that correspond to annotator topic preferences, the digital document annotation system can increase engagement and accuracy of resulting digital annotations.

Additionally, the digital document annotation system can improve efficiency. For instance, by generating and utilizing reliable ground-truth annotation data, the digital document annotation system can train machine learning models with less training data and fewer training iterations. Consequently, the digital document annotation system can utilize less time and computational resources to accurately train a machine learning model.

Moreover, the digital document annotation system also improves flexibility relative to conventional systems. For example, by utilizing annotation performance data collected from client devices, the digital document annotation system can analyze and utilize digital annotations from any variety of different annotators. Indeed, by analyzing annotation performance data from client devices, the digital document annotation system can flexibly generate reliable annotation data from any a wide array of annotator (without rigidly relying on experts). Furthermore, the digital document annotation system can generate an abundance of reliable annotation data with less time due to the increased pool of annotators.

Furthermore, the digital document annotation system can provide improved user interfaces that reduce the time and number of user interactions required to collect and analyze digital annotations from annotator client devices. For instance, in one or more embodiments, the digital document annotation system generates a user interface that includes a digital annotation summary graph. In particular, the digital document annotation system can generate a digital annotation summary graph that portrays annotations of a plurality of annotators over different portions of an electronic document. Such a user interface allows computing devices to efficiently provide digital annotations from a plurality of annotators, reducing user interactions (clicks), user interfaces, and navigation time. Moreover, as outlined in greater detail below, the digital document annotation system can provide various user interfaces for efficiently and accurately collecting digital annotations from individual annotators.

As illustrated by the foregoing discussion, the present disclosure utilizes a variety of terms to describe features and advantages of the digital document annotation system. Additional detail is now provided regarding the meaning of such terms. As used herein, the term "digital annotation" (sometimes referred to as "annotation" or "document annotation") refers to digital markings or notes corresponding to an electronic document. In particular, digital annotation includes digital markings or notes that identify, indicate, and/or present facts, thoughts, significance, and/or commentary on a digital document. For example, a digital annotation can include, but is not limited to, digital highlights on text in an electronic document, digital comments linked to portions of an electronic document, digital underlines on text in a digital document, and other digitally drawn markings on an electronic document. Furthermore, as used herein, the term "digital highlight" (sometimes referred to as "highlight") refers to a digital feature that emphasizes a portion of a document. For instance, a digital highlight can include, but is not limited to, color on text in a document, color of text in a document, or a change in formatting of text in a document such as underlining, bolding, and italicizing text.

As used herein, the term "annotator" refers to an individual or user that provides user input of annotations for electronic documents. In particular, the term "annotator" refers to an individual that reviews an electronic document and produces digital annotations for the electronic document via a client device.

As used herein, the term "electronic document" (sometimes referred to as "digital document" or "document") refers to any digital representation of text. In particular, the term "document" refers to an electronic file that includes text. For example, the term "document" includes a word processing file (e.g., file extensions .doc, .docx, .txt, or .wpd), a digital image file that includes text (e.g., file extensions .pdf, .jpg, .tif, or .ai), or other digital files (e.g., web files such as .html or .j s, spreadsheet files such as .xls, or video files that contain text)

As used herein, the term "annotator document topic preference" (sometimes referred to as "document topic preference" or "topic preference") refers to a topic of interest for an annotator. In particular, the term "annotator document topic preference" includes a selection of a topic that interests an annotator. Moreover, the term "document topic" refers to a genre, a subject, and/or a type for a document. For example, annotator document topic preferences can include a selection of preferred subjects for documents such as science, history, sports, business, technology, politics, news, art and so forth.

As used herein, the term "annotation performance data" (sometimes referred to as "annotator performance data" or "performance data") refers to conduct of an annotator. In particular, annotation performance data includes conduct of an annotator via a client device in relation to generating annotations of an electronic document. For example, the annotation performance data can include time periods, scroll actions, cursor actions, annotator responses, annotator questions, eye tracking data, annotator profile data, and/or any other annotator interactions with an electronic document annotated by the annotator.

As used herein, the term "scroll action" refers to digital input for navigation in a user interface. In particular, the term "scroll action" refers to digital input from an annotator to navigate between portions of an electronic document. For example, scroll actions can include input received from computer peripherals to navigate an electronic document, input received for clicking and dragging a scroll bar in a user interface to navigate an electronic document, and touch screen input received to navigate an electronic document.

As used herein, the term "portion" (sometimes referred to as "electronic document portion") refers to segments and/or regions of an electronic document. In particular, the term "portion" refers to segments and/or regions that are demarcated in an electronic document by various characteristics of the electronic document and/or a user interface for the electronic document. For example, a portion can include a segment and/or region of an electronic document that is demarcated by characteristics such as pixel coordinates, textual segments, scrolling coordinates, currently displayed in user interface segments, and pre-determined regions of the electronic document.

As used herein, the term "annotation question" (sometimes referred to as "question") refers to a question corresponding to content of an electronic document. In particular, the term "annotation question" refers to a question corresponding to the content of an electronic document to evaluate the comprehension of an annotator for the content of the electronic document. For example, an annotation question can include a question corresponding to facts presented in the electronic document, a question corresponding to ideas presented in the electronic document, a question corresponding to inferences from the content of the electronic document, and a question corresponding to the context of terms in the electronic document.

As used herein, the term "annotator response" (sometimes referred to as "annotator answer," "answer," or "response") refers to an answer corresponding to an annotation question. In particular, the term "annotator response" refers to an answer provided by an annotator for an annotation question. For example, an annotator response can include a selection of an answer for an annotation question and a text-based answer provided by an annotator for an annotation question.

As used herein, the term "annotator question" (sometimes referred to as "annotator digital question") refers to an annotation question that is drafted by an annotator. In particular, the term "annotator question" refers to an annotation question that is drafted by an annotator for an electronic document reviewed by the annotator. For example, the annotator question can include a multiple-choice question and a free-text answer.

Furthermore, as used herein, the term "annotator answer" (sometimes referred to as "annotator digital answer") refers to an answer generated by an annotator (to an annotator question generated by the annotator). For example, an annotator answer includes a multiple-choice answer for a multiple-choice annotator question and a free-text answer for a free-text annotator question.

As used herein, the term "machine learning model" refers to a model that can be tuned (e.g., trained) based on training input to approximate unknown functions. In particular, the term "machine learning model" can include a model of interconnected digital neurons that communicate and learn to approximate complex functions and generate outputs based on a plurality of inputs provided to the model. For instance, the term "machine learning model" includes one or more machine learning algorithms. In particular, the term "machine learning model" includes deep convolutional neural networks (i.e., "CNNs") and fully convolutional neural networks (i.e., "FCNs"). In other words, a machine learning model is an algorithm that implements deep learning techniques, i.e., machine learning that utilizes a set of algorithms to attempt to model high-level abstractions in data.

As used herein, the term "annotation model" refers to a model for generating digital annotations in a digital image. In particular, the term "annotation model" includes a model that determines digital annotations for content in an electronic document. To illustrate, an annotation model can analyze the content of an electronic document and generate a data set of model digital annotations for an electronic document. Moreover, an annotation model can comprise a machine learning model that is trained to analyze the content of an electronic document to automatically generate model digital annotations for the electronic document. Furthermore, as used herein, the term "model digital annotation" (sometimes referred to as "model annotation") refers to digital annotations generated by an annotation model.

As used herein, the modifier "training" (e.g., as used in training electronic document, training digital annotations, training data set of key sentences of an electronic document, or training data) indicates any object or information utilized to train a machine learning model (e.g., a neural network). Thus, for example, "training electronic document" refers to an electronic document that is used to train a neural network. In particular, in one or more embodiments, training electronic document includes electronic documents that the digital document annotation system provides to a neural network to train the neural network to predict digital annotations from the electronic document.

Turning now to FIG. 1, additional detail will be provided regarding an environment for implementing the digital document annotation system. In particular, FIG. 1 illustrates a schematic diagram of an exemplary environment 100 in which a digital document annotation system 110 can operate in accordance with one or more embodiments. As shown, the environment 100 includes server(s) 102, a document repository 114, a plurality of annotator client devices 104a-104n, and a client device 112 (e.g., a client device of an administrator) connected via a network 106.

The annotator client devices 104a-104n, the network 106, the client device 112, the document repository 114, and the server(s) 102 may communicate with each other or other components using a variety of communication technologies. The network 106 may be any suitable network over which the annotator client devices 104a-104n, the client device 112, the document repository 114, and the server(s) 102 can communicate. Additional detail regarding the network 106 will be provided below (e.g., with regard to FIG. 13).

As illustrated in FIG. 1, the environment 100 may include the annotator client devices 104a-104n and the client device 112. The annotator client devices 104a-104n and the client device 112 may comprise any computing device, including computing devices described below with regard to FIG. 13. For example, the annotator client devices 104a-104n and the client device 112 may comprise mobile devices, tablets, computers, and laptops. Although three annotator client devices 104a-104n and one client device 112 are presented with regard to FIG. 1, it will be appreciated that the annotator client devices 104a-104n and the client device 112 may comprise any number of client devices (greater or smaller than shown).

Furthermore, the environment 100 may also include the document repository 114. The document repository 114 may comprise one or more computing device that store electronic documents. In one or more embodiments, the document repository 114 may be stored as part of the server(s) 102.

Additionally, the environment 100 may also include the server(s) 102. The server(s) 102 may generate, store, receive, and transmit any type of data, including, for example: documents from the document repository 114, digital annotations, digital annotation performance data, and digital annotation models such as machine learning models for digital annotations. For example, the server(s) 102 may receive/send data from/to a client device, such as the annotator client devices 104a-104n (and/or the client device 112). In one example embodiment, the server(s) 102 is a data server. The server(s) 102 can also comprise a communication server or a web-hosting server. Additional details regarding the server(s) 102 will be discussed below with respect to FIG. 13.

As shown in FIG. 1, in one or more embodiments, the server(s) 102 can include a digital document management system 108 that also implements at least a portion of the digital document annotation system 110. The digital document management system 108 can store one or more digital document items and modify one or more digital document items. Furthermore, the digital document management system 108 can include software and/or hardware tools that allow users of the annotator client devices 104a-104n to store and/or modify digital document items.

Furthermore, as illustrated in FIG. 1, the digital document management system 108 can include the digital document annotation system 110. The digital document annotation system 110 can comprise an application running on the server(s) 102 or a portion of the digital document annotation system 110 can be downloaded from the server(s) 102. For example, the digital document annotation system 110 can include a web hosting application that allows the annotator client devices 104a-104n, the client device 112, and the document repository 114 to interact with content hosted at the server(s) 102.

As just mentioned, the digital document annotation system 110 may be implemented in whole, or in part, by the individual elements 102-114 of the environment 100. It will be appreciated that although certain components of the digital document annotation system 110 are described in the previous examples with regard to particular elements of the environment 100, various alternative implementations are possible. For instance, in one or more embodiments, the digital document annotation system 110 is implemented on the annotator client device 104a. Similarly, in one or more embodiments, the digital document annotation system 110 may be implemented on the server(s) 102. Moreover, different components and functions of the digital document annotation system 110 may be implemented separately among annotator client devices 104a-104n, the server(s) 102, the document repository 114, the client device 112, and the network 106.

As just mentioned, the digital document annotation system 110 can identify digital annotations and annotator performance data to generate reliable digital annotations. For example, FIG. 2 illustrates the digital document annotation system 110 generating reliable digital annotations for an electronic document in accordance with one or more embodiments.

Figure 2:
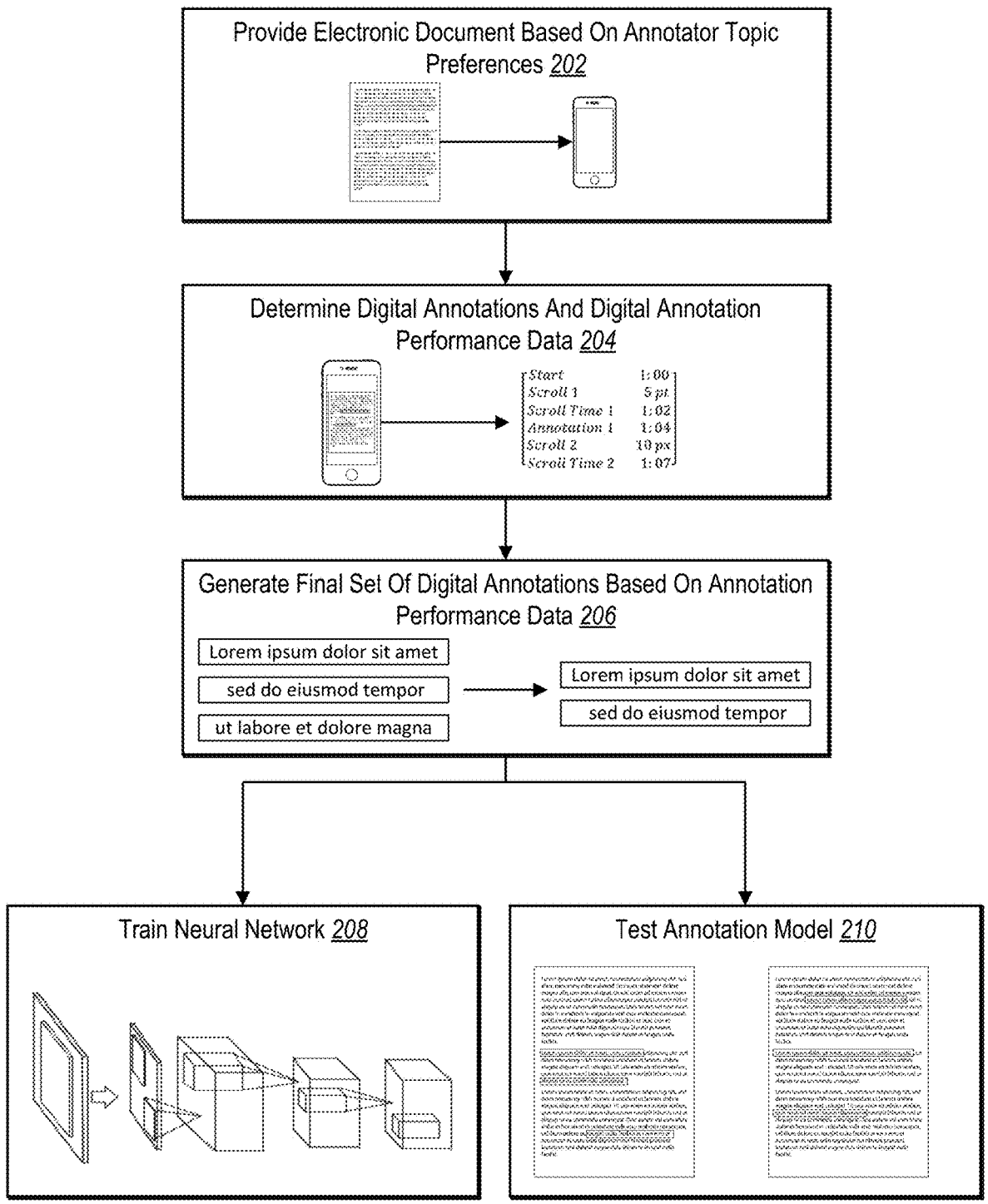
FIG. 2 illustrates a flow chart of generating digital annotations for an electronic document in accordance with one or more embodiments.

In particular, in relation to FIG. 2, the digital document annotation system 110 provides an electronic document to an annotator via the annotator client device 104a, determines digital annotations and annotation performance data from the annotator client device 104a, and generates a final set of digital annotations for the electronic document based on digital annotations and annotation performance data from the annotator client device 104a. Additionally, as shown in FIG. 2, the digital document annotation system 110 provides the final set of digital annotations for neural network training and/or to test an annotation model.

More specifically, as shown in FIG. 2, the digital document annotation system 110 performs an act 202 of providing electronic documents based on annotator topic preferences to the annotator. For instance, upon a user signing in (and/or after providing instructions to the annotator), the digital document annotation system 110 can automatically analyze and determine main topics for the electronic documents in the document repository 114. Additionally, the digital document annotation system 110 can determine annotator topic preferences by utilizing various data such as annotator profiles, annotator selections, and annotation performance data from the annotator for other electronic documents.

The digital document annotation system 110 can also select electronic documents from the document repository 114 that comprise a determined main topic that matches the determined annotator topic preferences. Moreover, the digital document annotation system 110 can provide the selected electronic documents to the annotator via the annotator client device 104a for review and for generating digital annotations. In one or more embodiments, the digital document annotation system 110 proposes one or more determined topics for selection to the annotator to further refine topics of interest and identify an electronic document to provide to the annotator. Additional detail for determining annotator topic preferences and providing electronic documents to an annotator is provided in FIG. 3 below.

Furthermore, as shown in FIG. 2, the digital document annotation system 110 performs an act 204 of determining digital annotations and annotation performance data from the annotator (e.g., via the annotator client device 104a). For example, the digital document annotation system 110 can provide example annotations to the annotator and then collect digital annotations for the provided electronic document based on annotator user interactions with the annotator client device 104a and the electronic document.

Moreover, the digital document annotation system 110 can utilize the annotator client device 104a to track annotation performance data for the annotator based on user interactions with the annotator client device 104a and the electronic document on an annotation user interface. In one or more embodiments, the annotation performance data includes time spent by the annotator in reviewing the electronic document, scroll actions of the annotator, cursor movements of the annotator, and questions/responses of the annotator for the electronic document. For example, the system can provide questions, receive annotator responses, and receive annotator question-answer pairs.

To illustrate, the digital document annotation system 110 can detect selections (or de-selections) of key portions of the electronic document (e.g., mouse-click or drag and drop). When the annotator selects (or de-selects) a portion of the electronic document, the digital document annotation system 110 can record an annotator ID, timestamp of the action, a pointer to the key portion, and the document ID. Moreover, when the annotator scrolls (or performs other actions), the digital document annotation system 110 can record the annotator ID, the action, the timestamp, and the document ID. The digital document annotation system 110 can also record the timestamps when the annotator is presented the document and when the annotator completes annotations of the electronic document. Additional detail for identifying digital annotations and annotation performance data will be provided in FIGS. 4A-4H below.

Additionally, as illustrated in FIG. 2, the digital document annotation system 110 performs an act 206 of generating a final set of digital annotations based on annotation performance data. For instance, the digital document annotation system 110 can obtain digital annotations for the electronic document from the annotator client devices 104a-104n and annotation performance data from each annotator client device 104a-104n. Moreover, the digital document annotation system 110 can utilize the annotation performance data to identify reliable and/or accurate annotators by comparing the annotation performance data with performance thresholds. For instance, the digital document annotation system 110 can filter annotators and corresponding annotations based on whether annotation performance data satisfies one or more performance thresholds. Additional detail for generating a final set of digital annotations based on the annotation performance data is provided in FIG. 5 below.

Moreover, as shown in FIG. 2, the digital document annotation system 110 performs an act 208 of training a neural network. For example, the digital document annotation system 110 can provide the generated final set of digital annotations (i.e., as ground-truth digital annotations) and the electronic documents corresponding to the final set of digital annotations to a neural network. Furthermore, the digital document annotation system 110 can utilize the neural network to analyze the electronic documents and predict digital annotations for the electronic document that correspond to key sentences of the electronic document. Additionally, the digital document annotation system 110 can determine a calculated loss for the neural network by utilizing a loss function to compare the predicted digital annotations from the neural network to the generated ground-truth digital annotations. In one or more embodiments, the digital document annotation system 110 can provide the calculated loss to the neural network so that the neural network can learn to more accurately predict digital annotations from the electronic documents. More detail for training a neural network with the generated final set of digital annotations is provided in FIG. 6 below.

Furthermore, as shown in FIG. 2, the digital document annotation system 110 can also perform an act 210 of testing an annotation model. For instance, the digital document annotation system 110 can receive digital annotations generated by an annotation model for the electronic documents. Moreover, the digital document annotation system 110 can compare the digital annotations generated by the annotation model with the final set of digital annotations to evaluate the accuracy of the annotation model. For example, the digital document annotation system 110 can base the accuracy of the annotation model on the percentage of digital annotations from the annotation model that match the final set of digital annotations for the electronic documents. Additional detail for testing annotation models with the generated final set of digital annotations is described in FIG. 7 below.

Figure 3:
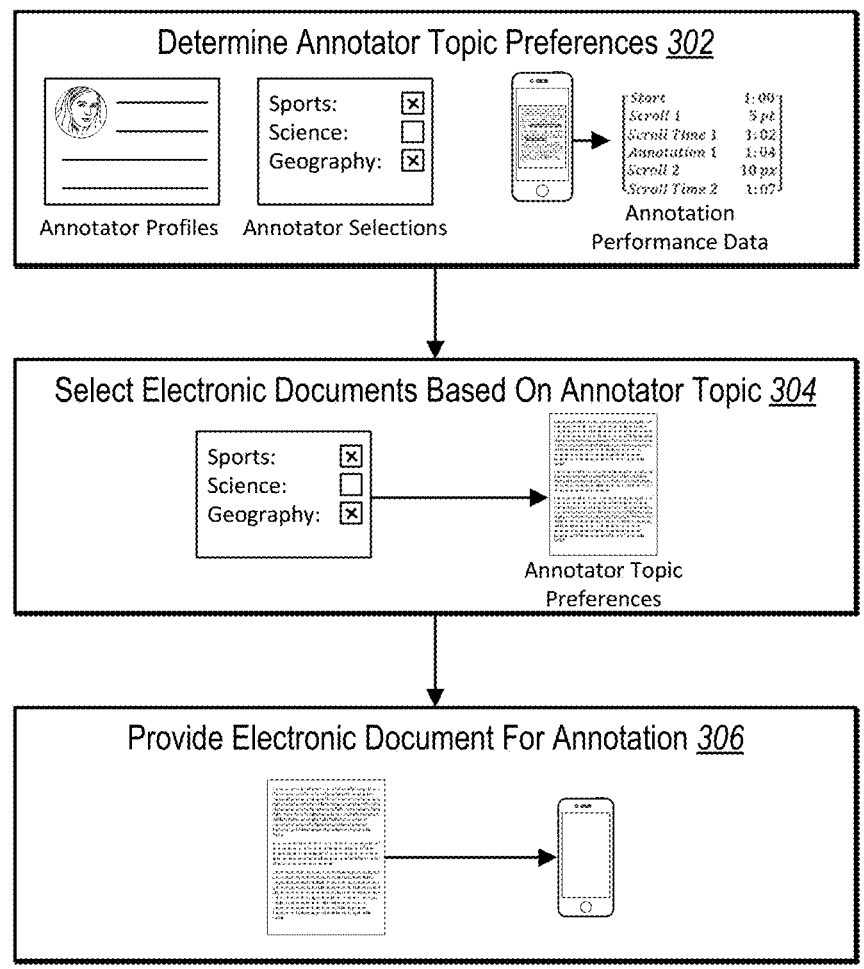
FIG. 3 illustrates a flow chart of providing electronic documents to annotators based on annotator topic preferences in accordance with one or more embodiments.

As just mentioned, the digital document annotation system 110 can provide electronic documents to annotators based on annotator topic preferences. For example, FIG. 3 illustrates the digital document annotation system 110 providing electronic documents to annotators based on annotator topic preferences in accordance with one or more embodiments. In particular, FIG. 3 illustrates the digital document annotation system 110 performing an act 302 of determining annotator topic preferences, an act 304 of selecting an electronic document based on annotator topic preferences, and an act 306 of providing the electronic document for annotation.

Specifically, as shown in FIG. 3, the digital document annotation system 110 determines annotator topic preferences 302 for one or more annotators. For example, the digital document annotation system 110 can determine annotator topic preferences 302 for one or more annotators by utilizing information corresponding to the annotators. More specifically, as shown in FIG. 3, the digital document annotation system 110 can utilize annotator profiles, annotator selections, and/or annotation performance data from annotators to determine the annotator topic preferences 302 for one or more of the annotators. In one or more embodiments, the digital document annotation system 110 can utilize any combination of the annotator information to determine the annotator topic preference for the annotator.

In one or more embodiments, the digital document annotation system 110 can utilize annotator profile information to determine annotator topic preferences for an annotator. For instance, the digital document annotation system 110 can utilize annotator profile information such as annotator demographic information, annotator interests, and other characteristics corresponding to the annotator. Indeed, the digital document annotation system 110 can utilize demographic information such as gender, race, geographic location, language proficiency, and age. Moreover, the digital document annotation system 110 can also utilize annotator interests such as, but not limited to, hobbies corresponding to the annotator, music interests, movie interests, travel interests, memberships, and sporting interests. Additionally, the digital document annotation system 110 can utilize other characteristics corresponding to the annotator such as, but not limited to, the device characteristics for the device utilized by the annotator, occupation information, purchase history, and browsing history.

Indeed, the digital document annotation system 110 can utilize the annotator information mentioned above to determine topics of interest for the annotator. Moreover, the digital document annotation system 110 can utilize the determined topics of interest to generate and store annotator topic preferences for the annotator. For example, the digital document annotation system 110 can determine that the annotator topic preferences for an annotator includes business and astronomy based on information such as the annotator having a membership in a business/entrepreneur magazine and the annotator being an astronomy professor.

Furthermore, the digital document annotation system 110 can utilize annotator topic selections to determine the annotator topic preferences. For instance, the digital document annotation system 110 can provide an annotator with selectable topics on the annotator client device 104a. Indeed, the selectable topics can include topics such as, but not limited to, science, history, sports, business, technology, politics, news, and art. In some embodiments, the annotator selects one or more of the topics on an annotation user interface on the annotator client device 104a. The annotator client device 104a then provides the selected topics to the digital document annotation system 110 as the annotator topic preferences.

Additionally, the digital document annotation system 110 can utilize annotation performance data for the annotator to determine the annotator topic preferences. For example, the digital document annotation system 110 can identify annotation performance data from other electronic documents that the annotator has reviewed and/or in electronic documents in which the annotator has generated digital annotations. For example, the digital document annotation system 110 can determine the electronic documents in which the annotator provided high quality annotations (i.e., annotations and annotator performance data that satisfied performance thresholds indicating reliability and accuracy). Moreover, the digital document annotation system 110 can determine the topic of these electronic documents and utilize those topics as the annotator topic preferences. Indeed, by utilizing similar topics to the electronic documents in which the annotator has previously performed accurately, the digital document annotation system 110 can determine that the annotator will continue to provide reliable and/or accurate digital annotations for electronic documents with similar topics.

Furthermore, the digital document annotation system 110 can determine annotator topic preferences 302 with any combination of annotator information. For example, the digital document annotation system 110 can utilize both the annotator user profiles and the annotation performance data to determine annotator topic preferences for an annotator. Also, the digital document annotation system 110 can utilize annotator profiles, annotator topic selections, and annotation performance data to determine the annotator topic preferences.

Additionally, the digital document annotation system 110 can store the determined annotator topic preferences on the server(s) 102. For example, the digital document annotation system 110 can associate the determined annotator topic preferences for an annotator by associating the determined annotator topic preferences with the annotator. Indeed, the digital document annotation system 110 can associate the determined annotator topic preference with the annotator by, but not limited to, mapping a reference to the topic preference with a profile for the annotator and utilizing database flags for the topic preferences in a data table of annotators.

In addition to determining annotator topic preferences, the digital document annotation system 110 can also select electronic documents based on the annotator topic preferences. In particular, the digital document annotation system 110 can utilize the document repository 114 to select electronic documents from a collection of electronic documents, can automatically determine main topics based on the content of the electronic documents, and select the electronic documents based on the annotator topic preferences.

Indeed, as shown in FIG. 3, the digital document annotation system 110 performs an act 304 of selecting electronic documents based on annotator topic preferences. For instance, the digital document annotation system 110 can select electronic documents from a document repository (e.g., the document repository 114) with content that corresponds to the annotator topic preferences. In particular, the digital document annotation system 110 can access a document repository, analyze the electronic documents to determine main topics for the content of the electronic documents, and select the electronic documents for an annotator based on an annotator topic preference that matches the determined main topics.

In some embodiments, the digital document annotation system 110 accesses a document repository with a variety of different electronic documents. For instance, the document repository 114 can include electronic documents with various subject matters such as, but not limited to, science, history, sports, business, technology, politics, news, and art. Indeed, in one or more embodiments, the document repository 114 can include documents from the Document Understanding Convention dataset ("DUC"). Furthermore, in some embodiments, the electronic documents from the DUC dataset can include a matching summary for the electronic documents in the DUC dataset.

Additionally, in one or more embodiments, the digital document annotation system 110 can determine main topics from the content of the electronic documents in the document repository 114. For instance, the digital document annotation system 110 can utilize topic modelling algorithms to analyze the content of electronic documents to determine main topics for the electronic documents. In particular, in one or more embodiments, the digital document annotation system 110 can utilize a latent Dirichlet allocation model to determine topics from the content of the electronic documents.

For example, the latent Dirichlet allocation model can determine the various topics that are represented by the words in an electronic document and also the amount of times the various topics are represented in the electronic document to determine the topic of the electronic document. In some embodiments, the digital document annotation system 110 can utilize Collapsed Gibbs sampling to teach a latent Dirichlet allocation model to assign topics to each document.

For instance, the digital document annotation system 110 can generate a word distribution of topics. For example, the digital document annotation system 110 can utilize N number of topics. Furthermore, the digital document annotation system 110 can randomly assign topics from the N number of topics to each word in the electronic documents from the document repository 114. Additionally, the digital document annotation system 110 can generate a word distribution of topics by calculating the number of times a word is assigned to a specific topic from the N number of topics.

After randomly assigning the N number of topics to each word in the electronic documents to generate a word distribution of topics, the digital document annotation system 110 can improve the topic assignments by utilizing Collapsed Gibbs sampling to calculate a probability for the selected topics corresponding to each word. For instance, the digital document annotation system 110 can calculate, for each electronic document, the proportion of words in an electronic document that are assigned to a selected topic. Furthermore, the digital document annotation system 110 can calculate the proportion of assignments to the selected topic that are based from a selected word throughout all the electronic documents. Additionally, the digital document annotation system 110 can calculate the probability that the selected topic generated the selected word by multiplying the two calculated proportions (i.e., proportion of words in an electronic document that are assigned to a selected topic by the proportion of assignments to the selected topic that are based from a selected word throughout all the electronic documents).

Additionally, the digital document annotation system 110 can determine final topics for the words. In some embodiments, the digital document annotation system 110 can reassign another topic to the selected word and calculate the probability that the new topic generated the selected word by using the above calculations for the new topic. Indeed, the digital document annotation system 110 can repeat this probability calculation by reassigning topics to each word in the electronic documents and determining the probability that the reassigned topic generated the respective word until the calculated probability achieves a stable state.

Furthermore, the digital document annotation system 110 can utilize the final topics for the words to assign a topic to each electronic document. For instance, the digital document annotation system 110 can determine the proportions of words for each topic type present in an electronic document. Furthermore, the digital document annotation system 110 can assign a topic to the electronic document by selecting the topic corresponding to the group of words (i.e., words comprising the same topic assignment) with the highest proportion in the electronic document.

Additionally, in some embodiments, the digital document annotation system 110 can utilize the determined main topics for the electronic documents and the annotator topic preferences to select electronic documents for an annotator. For instance, the digital document annotation system 110 can utilize the annotator topic preferences for an annotator to find electronic documents that have a matching main topic to the annotator topic preferences. For example, as shown in FIG. 3, the digital document annotation system 110 can utilize annotator topic preferences selected by an annotator from the selectable topics on the annotator client device 104a to select an electronic document 304. Indeed, as shown in FIG. 3, the digital document annotation system 110 can determine the annotator topic preference to be sports and geography based on the selectable topics received from the annotator client device 104a and select electronic documents from the document repository 114 related to sports or geography.

As shown in FIG. 3, upon selecting electronic documents, the digital document annotation system 110 can perform an act 306 of providing the electronic documents for annotation. For example, the digital document annotation system 110 can provide the selected electronic documents related to sports or geography to the annotator client device 104a and request digital annotations for the selected electronic documents. In some embodiments, the digital document annotation system 110 can provide one electronic document at a time to the annotator and wait for digital annotations and annotation performance data for the electronic document before providing another electronic document for digital annotations. Moreover, in one or more embodiments, the digital document annotation system 110 can provide a set of electronic documents to the annotator for digital annotations and receive digital annotations and annotation performance data for each electronic document upon completion of each electronic document.

By determining annotator topic preferences for annotators and selecting electronic documents based on annotator topic preferences, the digital document annotation system can increase the reliability and accuracy of resulting digital annotations from the annotators. For instance, by selecting and providing electronic documents based on annotator topic preferences, the digital document annotation system 110 increases the engagement and motivation of an annotator while the annotator reviews the electronic document and provides digital annotations for the electronic document.

As just mentioned above, the digital document annotation system 110 can also identify annotation performance data for an annotator. In particular, the digital document annotation system 110 can utilize the annotator client device 104a to track and record digital annotations and annotation performance data by the annotator. For example, FIGS. 4A-4H illustrate tracking digital annotations and annotation performance data from a client device in accordance with one or more embodiments. For instance, as shown in FIGS. 4A-4H, the digital document annotation system 110 can utilize a client device to track digital annotations from an annotator, time periods of an annotator, scroll actions of an annotator, cursor actions of an annotator, annotator responses to annotation questions, and drafted annotator questions for the electronic document.

Figure 4A:
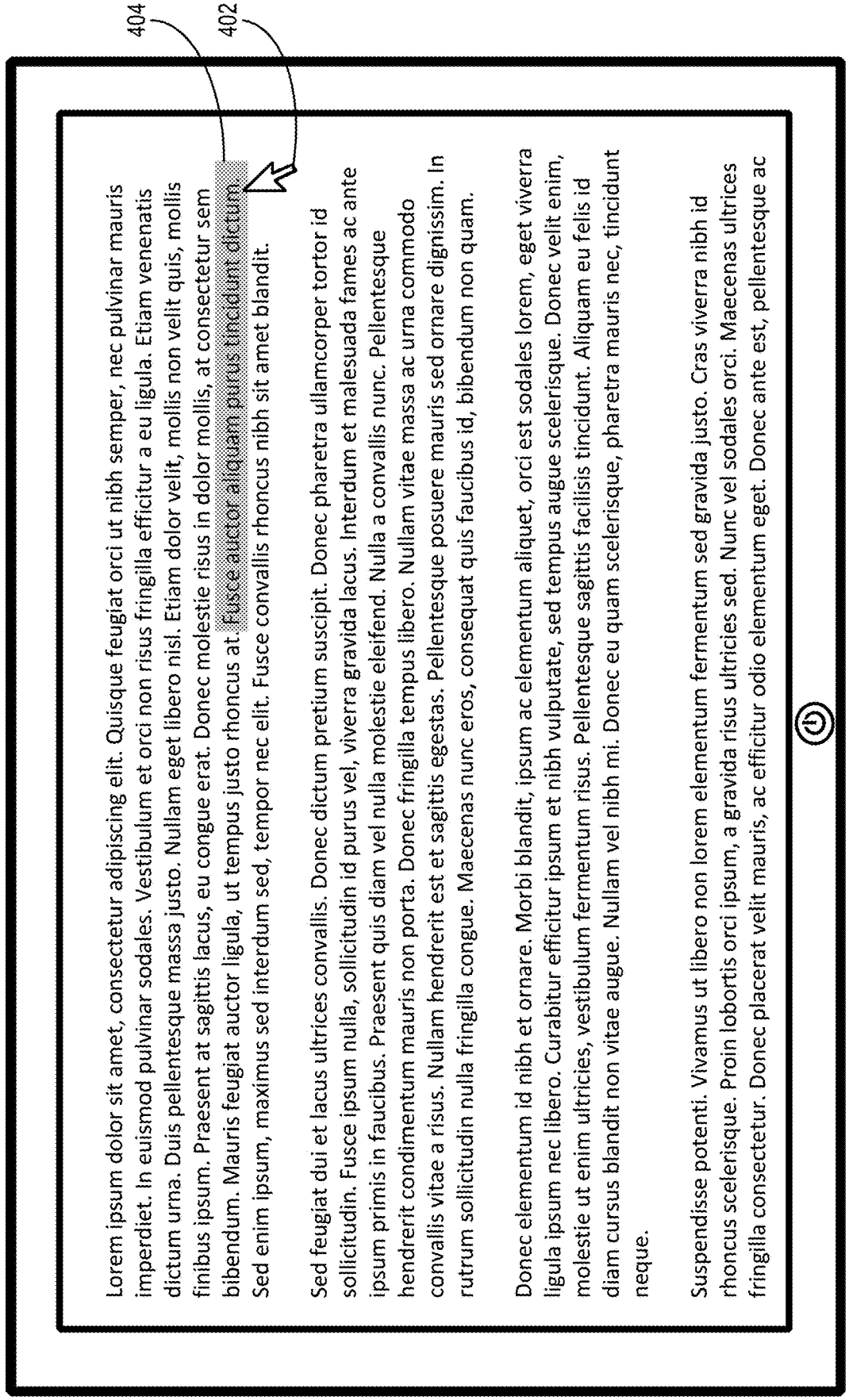
FIGS. 4A-4H illustrate identifying digital annotations and annotation performance data in accordance with one or more embodiments.

As illustrated in FIG. 4A, the digital document annotation system 110 can utilize a client device to track and identify digital annotations for an electronic document. Indeed, as illustrated in FIG. 4A, the digital document annotation system 110 can identify a selection of a word in the electronic document through a cursor action (i.e., a mouse click) 402 as a digital highlighting 404 of the selected word or sentence corresponding to the selected word in the electronic document. In one or more embodiments, the digital document annotation system 110 can identify the selection of a word in the electronic document through any type of input such as, but not limited to, a mouse click, a touch screen gesture, and a keyboard input.

Additionally, as shown in FIG. 4A, the digital document annotation system 110 can display a digital highlight 404 for the selected word or sentence. In one or more embodiments, the digital document annotation system 110 can utilize the annotator client device 104a to flag each digital annotation to an associated tag for each word in the electronic document. Moreover, the digital document annotation system 110 can generate an annotator log that tracks and records all the digital annotations and actions (e.g., annotator ID, timestamp, and document ID) of the annotator on the annotator client device 104a.

Figure 4B:
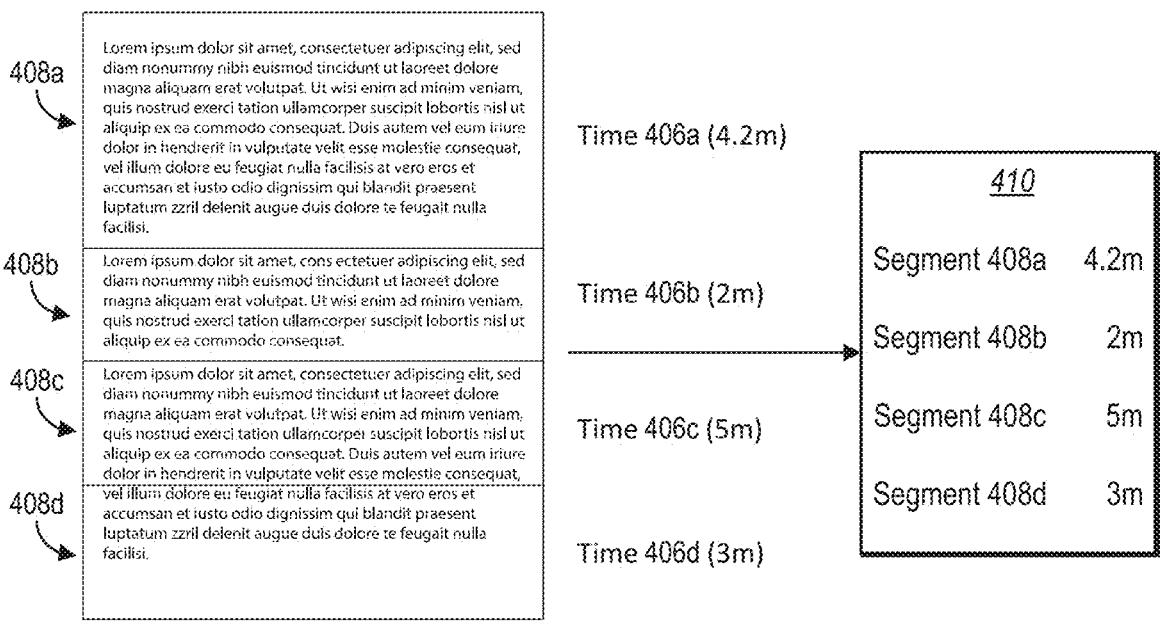

Furthermore, as shown in FIG. 4B, the digital document annotation system 110 can utilize the annotator client device 104a to track time periods of an annotator as annotation performance data. For instance, as shown in FIG. 4B, the digital document annotation system 110 can utilize the annotator client device 104a to track the amount of time an annotator spends at each segment of an electronic document. For example, as illustrated in FIG. 4B, the annotator client device 104a determines that the annotator spent time 406a (4.2 minutes) on segment 408a. Additionally, as shown in FIG. 4B, the annotator client device 104a determines that the annotator spent time 406b (2 minutes) on segment 408b, spent time 406c (5 minutes) on segment 408c, and spent time 406d (3 minutes) 406d on segment 408d. In one or more embodiments, the tracked time can be the amount of time each segment of the electronic document was displayed on the viewable display of annotator client device 104a.

Moreover, as shown in FIG. 4B, the digital document annotation system 110 can utilize the annotator client device 104a to store the time periods 406a-406d and corresponding segments 408a-408b in a data set of time periods for the annotator 410. The data set of time periods for the annotator 410 can comprise of each tracked time period 406a-406d for each segment 408a-408d of the electronic document. In some embodiments, the data set of time periods for the annotator 410 can include various types of tracked time periods.

Additionally, the digital document annotation system 110 can also track time periods in various methods. For example, the digital document annotation system 110 can utilize the annotator client device 104a to track time periods between scroll percentages (e.g., scroll position of a scroll bar or scroll well), timestamps for each digital annotation, timestamps for each annotator interaction with the annotator client device 104a while viewing the electronic document, completion times, start times, and timestamps for annotator responses to annotation questions for the electronic document. In one or more embodiments, the digital document annotation system 110 can utilize the client device to track such time periods and store such time periods in the data set of time periods for the annotator 410.

For instance, the digital document annotation system 110 can utilize the annotator client device 104a to track time periods between scroll percentages. For example, in one or more embodiments, the digital document annotation system 110 can utilize the annotator client device 104a to record the timestamp at each scroll action from the annotator. Furthermore, in some embodiments, the digital document annotation system 110 can utilize the annotator client device 104a to determine and record the amount of time spent for every ten percent scrolling interval on the electronic document. In particular, the digital document annotation system 110 can utilize the annotator client device 104a to determine the amount of scrolling in terms of percentages for the electronic document and record a timestamp for each ten percent scrolling checkpoint.

Furthermore, the digital document annotation system 110 can utilize the annotator client device 104a to track timestamps for each digital annotation and timestamps for any annotator interaction with the annotator client device 104a while viewing the electronic document. For instance, the digital document annotation system 110 can utilize the annotator client device 104a to identify a digital annotation generated by the annotator and record a timestamp corresponding to the digital annotation. Likewise, the digital document annotation system 110 can utilize the annotator client device 104a to identify any other annotator interaction with the annotator client device 104a, the annotation user interface, and/or the electronic document and record a timestamp corresponding to the annotator interaction. For example, in some embodiments, annotator interactions include clicks, scrolls, dragging, typing, and touch gestures.

Moreover, the digital document annotation system 110 can utilize the annotator client device 104a to track start times and completion times for the electronic document review. For example, in some embodiments, the digital document annotation system 110 can utilize the annotator client device 104a to record a timestamp when the annotator begins reviewing an electronic document. Furthermore, the digital document annotation system 110 can utilize the annotator client device 104a to record a timestamp at a completion time such as when an annotator completes reviewing the electronic document. For instance, the digital document annotation system 110 can utilize the annotator client device 104a to identify a selectable option for ending the review of the electronic document and can record a timestamp for completion upon identifying the selectable option.

Additionally, in some embodiments, the digital document annotation system 110 can determine timestamps and/or time periods for the annotation questions and annotator responses to the annotation questions. For example, the digital document annotation system 110 can utilize the annotator client device 104a to track the amount of time an annotator spends on an annotation question. Indeed, the digital document annotation system 110 can utilize the annotator client device 104a to record timestamps for when the annotator client device 104a displays an annotation question to the annotator and another timestamp for when the annotator provides a response to the annotation question. Additionally, in one or more embodiments, the digital document annotation system 110 can also utilize the annotator client device 104a to track the total time an annotator spends on all of the annotation questions provided to the annotator.

In one or more embodiments, the digital document annotation system 110 can utilize the timestamps and time periods recorded to generate various types of annotation performance data. For example, the digital document annotation system 110 can extrapolate the timestamps and time periods to determine insights such as, but not limited to, total annotator review times, total times between digital annotations, and average review speeds for multiple electronic documents. For instance, the digital document annotation system 110 can utilize the recorded starting time and the completion time for an electronic document to determine the total time spent by an annotator in reviewing the electronic document.

Figure 4C:
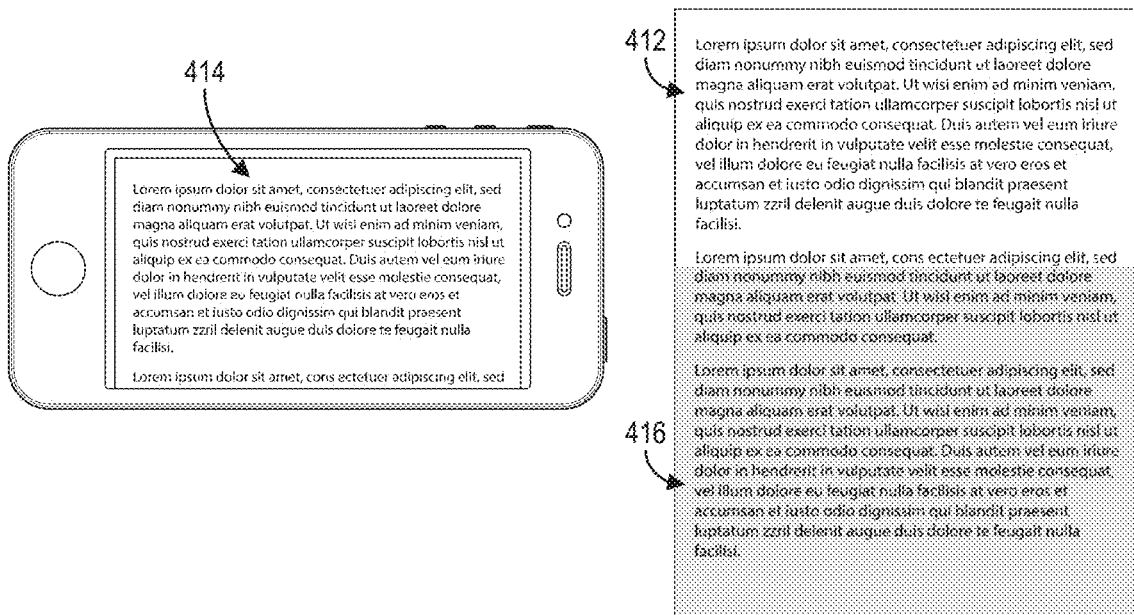

Furthermore, as illustrated in FIG. 4C, the digital document annotation system 110 can track scroll actions of an annotator as the annotation performance data. In particular, the digital document annotation system 110 can utilize the annotator client device 104a to track and record scroll actions of the annotator. For instance, the digital document annotation system 110 can utilize the annotator client device 104a to determine the portions of the electronic document that have been viewed by the annotator. Indeed, as shown in FIG. 4C, the digital document annotation system 110 can utilize the annotator client device 104a to track the viewed portions of the electronic document 412 on the display 414 of the annotator client device 104a and the unexplored portions of the electronic document 416. For example, the digital document annotation system 110 can utilize the annotator client device 104a to calculate the percentage of viewed portions 412 and the percentage of unexplored portions 416. In some embodiments, the digital document annotation system 110 can utilize the annotator client device 104a to determine pixel coordinates or scroll positions for the unexplored portions 416.

Additionally, in some embodiments, the digital document annotation system 110 can utilize the annotator client device 104a to track scrolling increments for the annotator. For example, the digital document annotation system 110 can determine scrolling increments for the electronic document in terms of percentages and utilize the annotator client device 104a to track each scrolling increment checkpoint. For instance, the digital document annotation system 110 can utilize the annotator client device 104a to track each ten percent scroll increment from the annotator.

Moreover, the digital document annotation system 110 can utilize the annotator client device 104a to record all scrolling actions of the annotator. For instance, the digital document annotation system 110 can utilize the annotator client device 104a to record all up and down scrolling actions. Indeed, the digital document annotation system 110 can utilize the annotator client device 104a to record the entire scrolling path of an annotator for an electronic document, including all changes in scroll directions from the annotator.

Figure 4D:
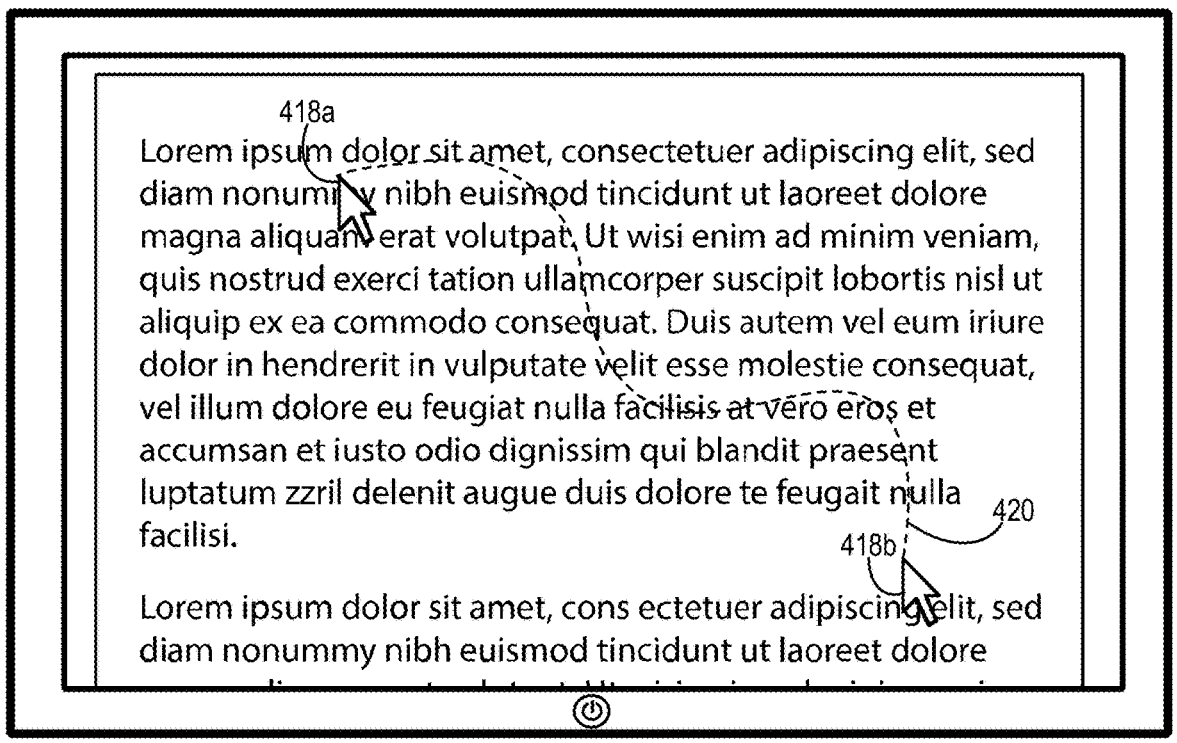

Furthermore, the digital document annotation system 110 can track cursor movements (e.g., cursor path) of the annotator on the annotation user interface. For example, FIG. 4D illustrates the digital document annotation system 110 utilizing the annotator client device 104a to track and record the cursor movements of the annotator. Indeed, as shown in FIG. 4D, the digital document annotation system 110 utilizes the annotator client device 104a to track the cursor path from cursor position 418a to cursor position 418b on an annotation user interface. For instance, the digital document annotation system 110 can utilize the annotator client device 104a to record pixel coordinates and timestamps for each cursor position between cursor position 418a and cursor position 418b on movement path 420.

Figure 4E:
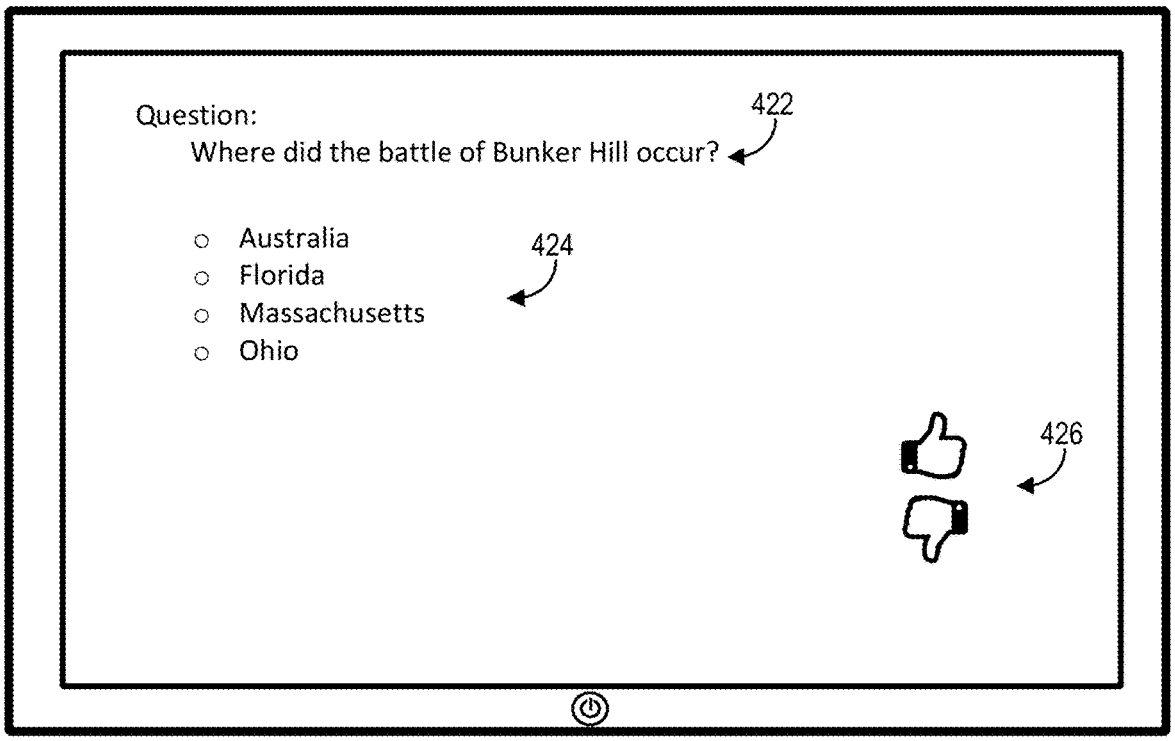

Additionally, as just mentioned above, the digital document annotation system 110 can also track annotation questions and annotator responses to the annotation questions. For example, FIG. 4E illustrates the digital document annotation system 110 utilizing the annotator client device 104a to display an annotation question 422 and annotator response choices 424 to the annotator. As shown in FIG. 4E, the annotation question can include questions corresponding to facts presented in the electronic document that is provided to the annotator on the annotator client device 104a. For example, as illustrated in FIG. 4E, the digital document annotation system 110 provides an annotation question 422 referencing the Battle of Bunker Hill. In some embodiments, the annotation question 422 referencing the Battle of Bunker Hill can be in response to providing an electronic document referencing the American Revolutionary War. Furthermore, the digital document annotation system 110, in some embodiments, can display any type of annotation question, including a multiple-choice question or a free-text question.

Moreover, the digital document annotation system 110 can utilize the annotator client device 104a to provide one or more annotation questions to the annotator at various times.

Figure 4F:
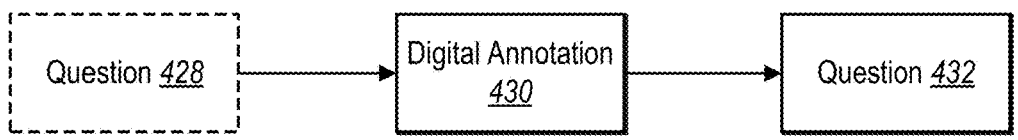
Figure 4G:
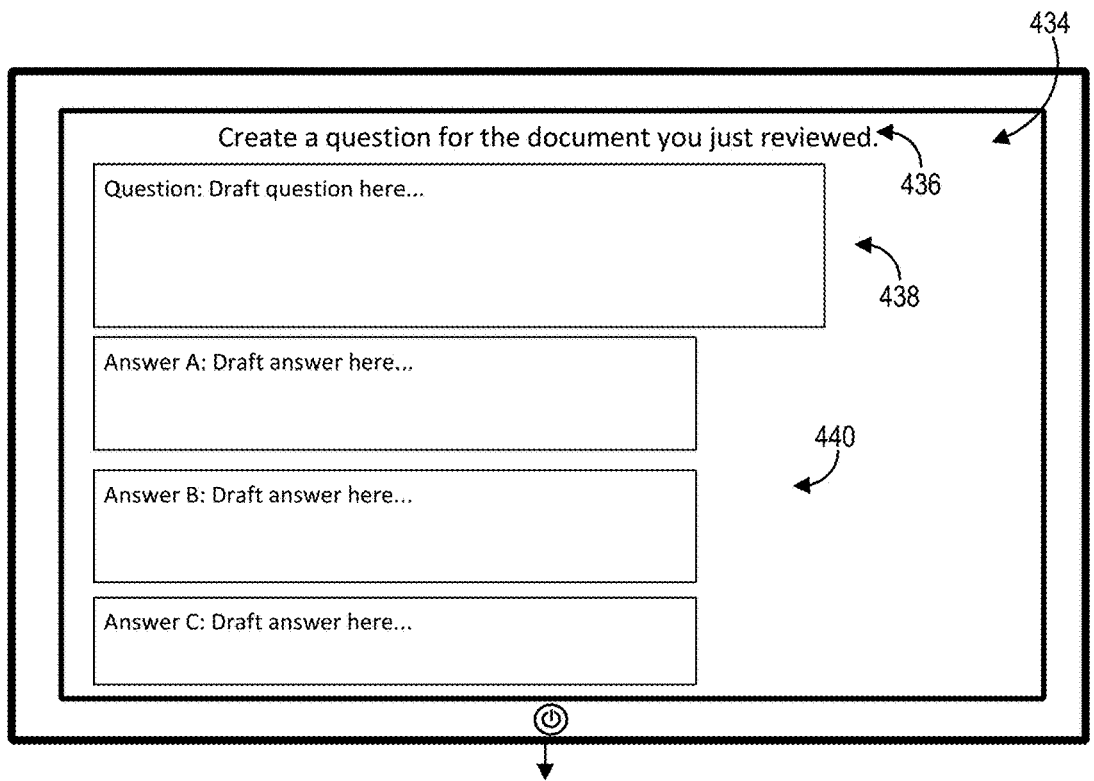
Figure 4G:
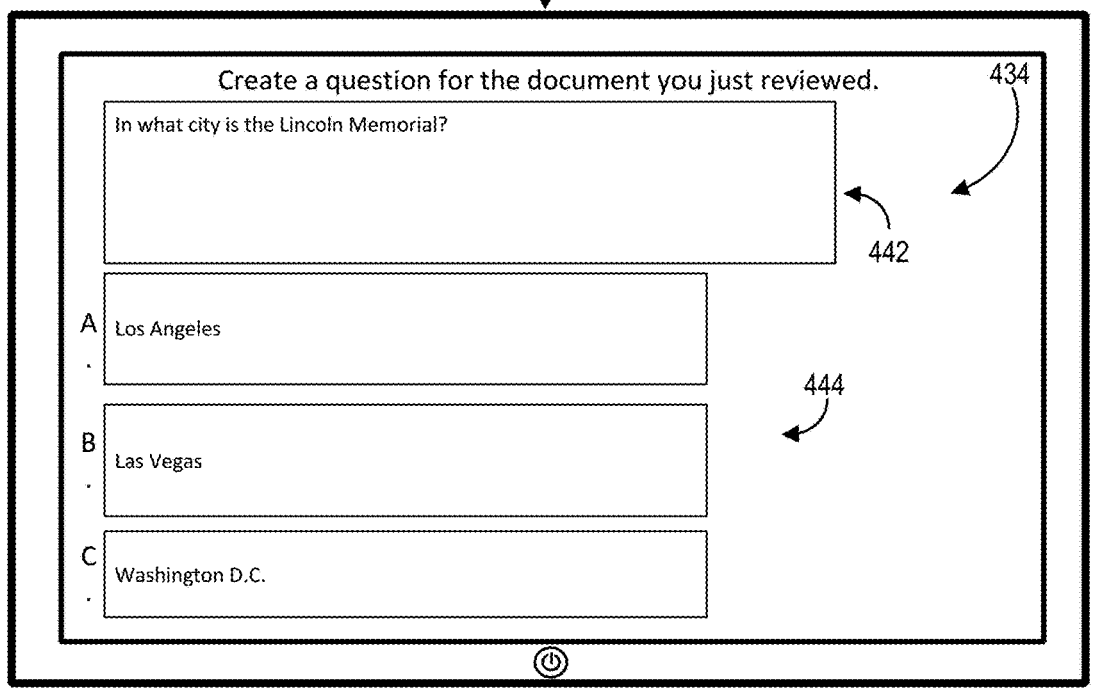

For instance, the digital document annotation system 110 can utilize the annotator client device 104a to provide the one or more annotation questions to the annotator after the annotator completes reviewing the electronic document and submits digital annotations for the electronic document. Furthermore, in some embodiments, the digital document annotation system 110 can prohibit the annotator from referencing the electronic document while answering the annotation questions. In one or more embodiments, the digital document annotation system 110 may utilize the annotator client device 104a to display the electronic document alongside the annotation questions. Additionally, the digital document annotation system 110 can provide questions drafted by annotators as the annotation questions, as shown in FIG. 4G.

In one or more embodiments, the digital document annotation system 110 can utilize the annotator client device 104a to track and record user feedback for the annotation questions. For instance, the digital document annotation system 110 can utilize the annotator client device 104a to display a user feedback option on the annotation questions for the electronic document. For example, as shown in FIG. 4E, the digital document annotation system 110 can utilize the annotator client device 104a to display a selectable thumbs up and thumbs down feedback button 426. Indeed, the digital document annotation system 110 can track and record annotator feedback for an annotation question by identifying a selection of the user feedback button 426 (e.g., to rate the quality of the question and/or answer options).

In some embodiments, the digital document annotation system 110 can provide one or more annotation questions after a digital annotation is detected from the annotator. For example, FIG. 4F illustrates a flow diagram that illustrates the digital document annotation system 104 utilizing the annotator client device 104a to provide an annotation question 432 after a digital annotation 430 is detected by the annotator client device 104a. For example, the digital document annotation system 110 can utilize annotator client device 104a to identify that the annotator has produced a digital annotation for the electronic document and display an annotation question 432 upon identifying the digital annotation. Furthermore, in one or more embodiments, the annotation question 432 can include an annotation question that references the content of the electronic document, an annotation question specific to the identified digital annotation, and a question that asks for the motivation behind the digital annotation from the annotator.

In some embodiments, the digital document annotation system 110 provides an annotation question that is a question that references the content of the electronic document. Indeed, the annotation question 432 can include any annotation question described above. Furthermore, in one or more embodiments, digital document annotation system 110 determines which annotation question to provide after identifying digital annotation 430 by determining where the digital annotation 430 is located in the electronic document. For instance, the digital document annotation system 110 can determine that the digital annotation 430 is located in a first portion of the electronic document and provide annotation questions that reference the first portion of the electronic document.

Additionally, in some embodiments, the digital document annotation system 110 can provide an annotation question that references the identified digital annotation 430. For example, in some embodiments, the digital document annotation system 110 can identify the digital annotation 430 and select an annotation question that specifically references the digital annotation 430. Indeed, in some embodiments, the digital document annotation system 110 selects an annotation question that is associated with the digital annotation 430 by selecting an annotation question that comprises a reference (i.e., an ID) to the digital annotation 430.

Moreover, in one or more embodiments, the digital document annotation system 110 can provide an annotation question 432 that requests the rationale for producing the digital annotation 430 from the annotator on annotator client device 104a. For example, the digital document annotation system 110, upon identifying a selection of digital annotation 430, can provide a free-text question 432 that asks the annotator to explain why the annotator produced digital annotation 430.

Furthermore, as shown in FIG. 4F, the digital document annotation system 110 can optionally provide an annotation question 428. For example, in some embodiments, digital document annotation system 110 can provide the annotation question 428 prior to detecting a digital annotation 430 or prior to the annotator completing review of the electronic document. For instance, the digital document annotation system 110 can provide the annotation question 428 as a preliminary question. Additionally, in some embodiments, the digital document annotation system 110 can provide the annotation question 428 upon detecting an annotator interaction with the annotator client device 104a such as a scroll action or a cursor movement.

As just mentioned, the digital document annotation system 110 can also provide the annotator with a question-answer pair user interface to receive annotator questions. For example, as shown in FIG. 4G, the digital document annotation system 110 utilizes the annotator client device 104a to display a question-answer pair user interface 434 to the annotator. Indeed, digital document annotation system 110 can utilize the question-answer pair user interface 434 to display instructions 436 to request that the annotator create a question for the electronic document. For instance, as shown in FIG. 4G, the digital document annotation system 110 can utilize the question-answer pair user interface 434 to request a multiple-choice question 438 and answers 440 for the multiple-choice question 438 for the electronic document from the annotator. In one or more embodiments, the digital document annotation system 110 can utilize the question-answer pair user interface to request various types of information from the annotator including any type of questions/answers from an annotator and summarizations of the electronic document from the annotator.

In some embodiments, the digital document annotation system 110 can identify annotator questions and annotator answers. Indeed, FIG. 4G illustrates the digital document annotation system 110 utilizing the question-answer pair user interface 434 to identify an annotator question 442 and annotator answers 444. For instance, the digital document annotation system 110 can utilize question-answer pair user interface 434 to receive text input for an annotator question 442 and annotator answers 444. In some embodiments, the digital document annotation system 110 receives an indication, from the annotator, of which annotator answer from annotator answers 444 is the correct answer.

Furthermore, digital document annotation system 110 can store annotator question 442 and annotator answers 444 upon receiving an indication of completion from the annotator. For example, the digital document annotation system 110 can identify a selection of a submit button from the annotator and, in response, store the annotator question 442 and the annotator answers 444 on server(s) 102. In one or more embodiments, the digital document annotation system 110 can store the annotator question 442, the annotator answers 444, and an indication of the correct answer on server(s) 102 with a reference to the electronic document and the drafting annotator.

In one or more embodiments, the digital document annotation system 110 can provide an annotator question and annotator answers drafted in a question-answer user interface to another client device (e.g., as an annotation question for the electronic document to another annotator). For example, FIG. 4H illustrates a flow diagram of the digital document annotation system 110 providing an annotator question (and/or annotator answers) drafted in a question-answer user interface to another client device as an annotation question.

Figure 4H:
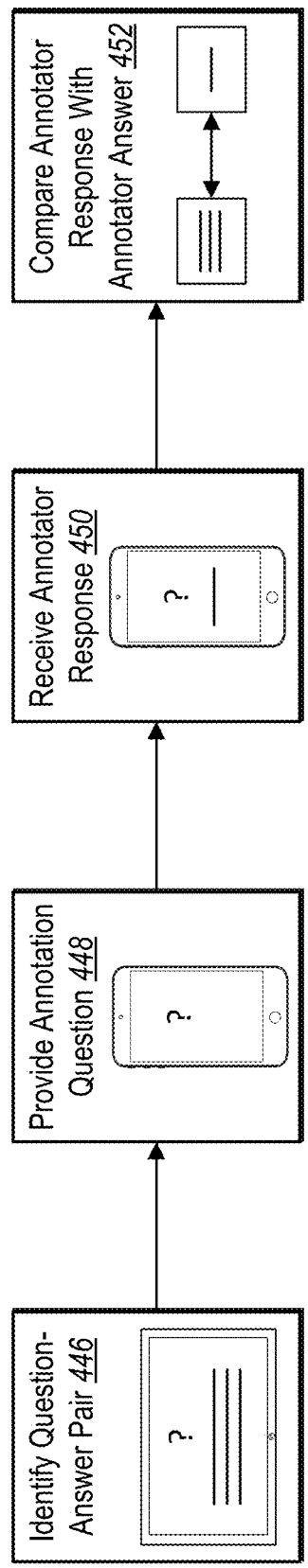

As illustrated in FIG. 4H, the digital document annotation system 110 performs an act 446 of identifying an annotator question-answer pair (e.g., via a question-answer pair user interface as described in FIG. 4G) for an electronic document. Furthermore, the digital document annotation system 110 can perform an act 448 of providing an annotation question. In particular, the digital document annotation system 110 can provide the annotator question (from the question-answer pair) to another client device (e.g., the annotator client device 104b) for an annotator reviewing an electronic document that is referenced by the question-answer pair. Additionally, the digital document annotation system 110 can perform an act 450 of receiving an annotator response. For instance, the digital document annotation system 110 can receive from annotator client device 104b, an annotator response corresponding to the annotation question.

Additionally, the digital document annotation system 110 can utilize the received annotator response (e.g., from the act 450) to determine the reliability and/or accuracy of the annotators (e.g., the accuracy of the annotator that provided the question-answer pair in the act 446 and/or the accuracy of the annotator that provided the annotator response in the act 450). For example, as shown in FIG. 4H, the digital document annotation system 110 can perform an act 452 of comparing the annotator response (from the act 450) with the annotator answer (from the question-answer pair in the act 446). Indeed, the digital document annotation system 110 can determine if the received annotator response is correct or incorrect by comparing the annotator response (from the act 450) to the annotator answer (from the act 446). More detail about determining the reliability and/or accuracy of an annotator is provided below in FIG. 5.

Furthermore, the digital document annotation system 110 can receive annotator feedback from other annotators (i.e., not the drafting annotator) for the annotator question-answer pair (from the act 446). Indeed, as described previously in relation to FIG. 4E, the other annotators can utilize the thumbs up/thumbs down feedback buttons 426 to provide feedback for an annotation question (and annotator answers) when they are presented as annotation questions. Moreover, the digital document annotation system 110 can attribute the feedback for the annotation question and the annotator answers to the drafting annotator. For example, the digital document annotation system 110 can increase the rating score of an annotation question when the digital document annotation system 110 receives a thumbs up 426 selection and decrease the rating score of the annotation question when the digital document annotation system 110 receives a thumbs down 426 selection.

Moreover, the digital document annotation system 110 can utilize the annotator feedback as annotation performance data. Indeed, the digital document annotation system 110 can utilize the annotator feedback for the annotation question as annotation performance data for the drafting annotator of the annotation question (i.e., the annotator that drafted the question-answer as part of the act 446). Additionally, the digital document annotation system 110 can utilize the feedback to determine whether or not to provide the annotator question to an annotator.

Although FIGS. 4A-4H illustrate specific approaches to determining annotation performance data, the digital document annotation system 110 can collect annotation performance data utilizing other approaches. For example, the digital document annotation system 110 can utilize the annotator client device 104a to collect other information from the annotator as annotation performance data. For instance, in some embodiments, the digital document annotation system 110 can utilize the annotator client device 104a to identify annotator location (e.g., annotator located at home, at a library, or at a movie theater) at the time the annotator generates digital annotations. Similarly, in some embodiments, the digital document annotation system 110 can provide a survey requesting information (e.g., demographic information or interest levels) from the annotator on the annotator client device 104a. Moreover, in some embodiments, the digital document annotation system 110 can utilize the annotator client device 104a to track and receive eye movement from the annotator and utilize this information as annotation performance data.

In some embodiments, the digital document annotation system 110 can utilize the annotator client device 104a to track and record the annotation performance data. Indeed, the digital document annotation system 110 can utilize the annotator client device 104a to track and record the annotation performance data in the background of the annotation user interface on the annotator client device 104a while an annotator reviews the electronic document and generates the digital annotations. Furthermore, the digital document annotation system 110 can utilize the annotator client device 104a to provide the tracked and collected annotation performance data to server(s) 102 for storage. In some embodiments, the digital document annotation system 110 can generate references to the annotator and annotator client device 104a providing the annotation performance data for the annotation performance data before storing the annotation performance data on the server(s) 102.

Figure 5:
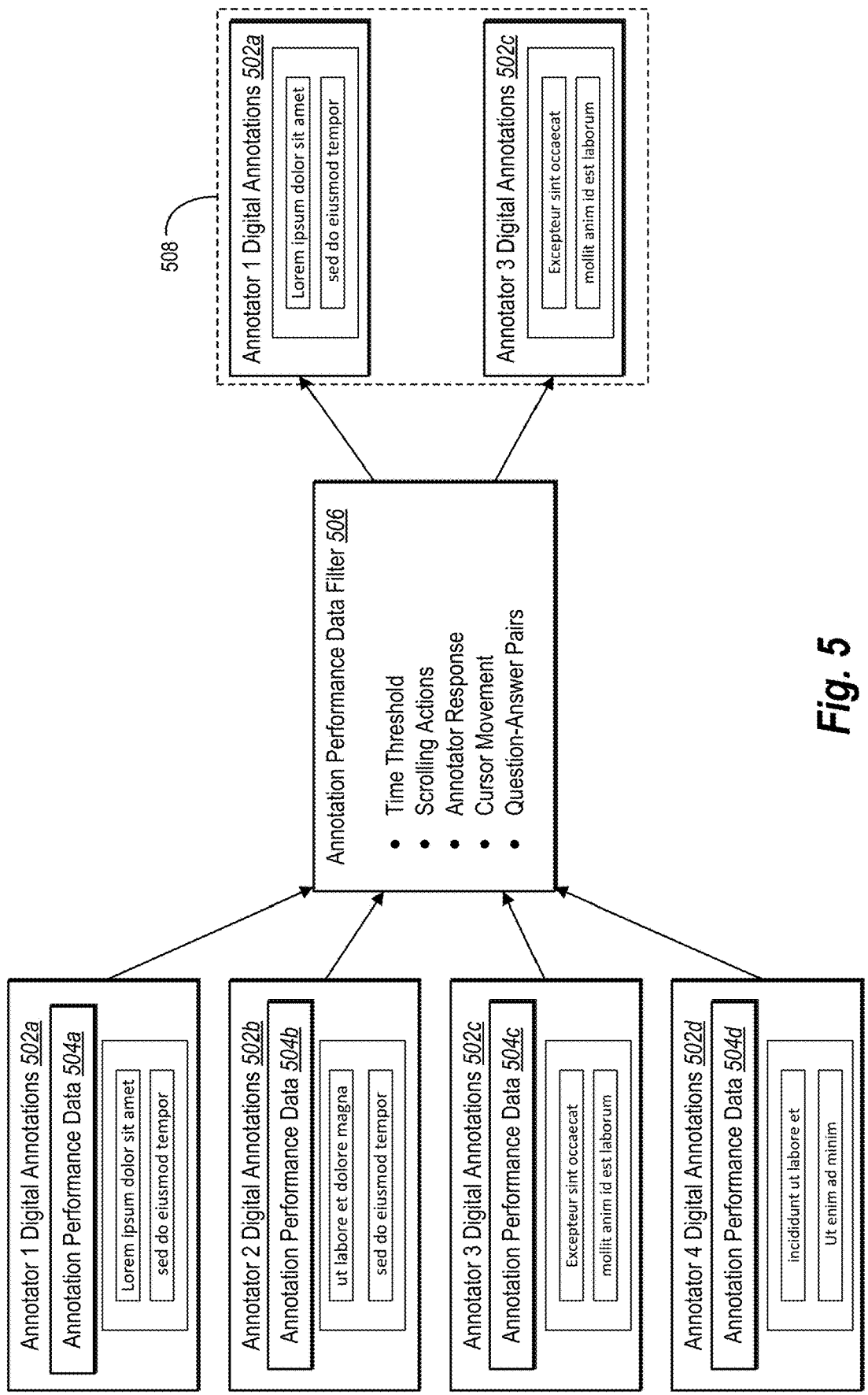
FIG. 5 illustrates a flow chart of generating digital annotations based on annotation performance data in accordance with one or more embodiments.

As mentioned above, the digital document annotation system 110 can utilize annotation performance data determine a reliable and accurate set of digital annotations for an electronic document. For example, FIG. 5 illustrates the digital document annotation system 110 generating a final set of digital annotations (i.e., a ground-truth data set of digital annotations) for an electronic document in accordance with one or more embodiments. In particular, as shown in FIG. 5, the digital document annotation system 110 receives annotator digital annotations 502a-502d and annotation performance data 504a-504d and utilizes an annotation performance data filter 506 to generate a final set of digital annotations 508 for the electronic document.

As shown in FIG. 5, the digital document annotation system 110 receives annotator digital annotations 502a-502d with annotator performance data 504a-504d. For instance, the digital document annotation system 110 identifies digital annotations 502a corresponding to annotator 1 and also identified annotation performance data 502b (e.g., in accordance with the description above in relation to FIG. 4). Similarly, the digital document annotation system 110 receives annotator digital annotations 502*b*-502*d* and annotation performance data 504*b*-504*d* for each of annotator 2, 3, and 4.

Additionally, the digital document annotation system 110 can generate a reliable set of digital annotations by utilizing an annotation performance data filtering algorithm. For example, as shown in FIG. 5, the digital document annotation system 110 utilizes annotation performance data filter 506 to generate a final set of digital annotations 508. Indeed, in one or more embodiments, the digital document annotation system 110 can utilize any combination of the annotation performance data, such as, but not limited to time thresholds, scrolling actions, question responses, cursor movement, and question-answer pairs in the annotation performance data filter 506 to generate the final dataset of digital annotations 508.

For example, in one or more embodiment, the digital document annotation system 110 can utilize time thresholds to generate a final dataset of digital annotations. Indeed, the digital document annotation system 110 can compare various time periods and/or timestamps from annotation performance data (collected in accordance to FIG. 4) of an annotator to predetermined time thresholds to determine if the annotator has produced reliable and/or accurate digital annotations. For instance, the digital document annotation system 110 can compare the time an annotator spent reviewing the entire electronic document to a time threshold that the digital document annotation system 110 has determined to be a minimum amount of time for an adequate review of the electronic document. Moreover, in some embodiments, the digital document annotation system 110 can flag the annotator as performing poorly (i.e., not accurate or reliable) when the time the annotator spent reviewing the electronic document is below the minimum threshold time.

Indeed, an annotator may have a recorded time of five minutes for the time spent reviewing the electronic document. The digital document annotation system 110 can compare this annotation performance data to a required threshold review time for the electronic document to determine if the annotator is reliable and/or accurate. For instance, the digital document annotation system 110 can determine that a minimum threshold review time for the electronic document is twenty-five minutes and flag the annotator as performing poorly for having a recorded time of five minutes.

Additionally, the digital document annotation system 110 can utilize other variations of time periods and/or timestamps from annotation performance data to determine the reliability and/or accuracy of an annotator. For instance, the digital document annotation system 110 can compare time periods of portions of electronic documents to threshold times for those same portions of the electronic document. Indeed, in some embodiments, the digital document annotation system 110 can require that the threshold time for the portions of the electronic document must be met for only a certain percentage of the document portions. Furthermore, in one or more embodiments, the digital document annotation system 110 can normalize the review threshold time or the time periods of the annotator to the length of the electronic document.

Furthermore, in one or more embodiments, the digital document annotation system 110 can generate a histogram of time periods for an annotator based on the annotation performance data 502*a*-502*b* to utilize in filtering the digital annotation data and the annotators. For example, the digital document annotation system 110 can generate a histogram of time periods for an annotator and compare the histogram to a distribution of review threshold time for the electronic document. In one or more embodiments, the digital document annotation system 110 can determine if the annotator is accurate and/or reliable by determining the amount of variation between the time period histogram and the distribution of review threshold times.

Moreover, in one or more embodiments, the digital document annotation system 110 can utilize scrolling actions to generate a final dataset of digital annotations. For example, the digital document annotation system 110 can determine whether or not the annotator reviewed the entirety of the electronic document based on whether or not the annotator scrolled through the entire electronic document. Moreover, the digital document annotation system 110 can flag the annotator as performing poorly when the digital document annotation system 110 determines that the annotator did not review the entire document based on the scrolling actions data. Additionally, the digital document annotation system 110 can determine whether or not an annotator spent an adequate amount of time through each portion of the electronic document by utilizing the scrolling actions data from each portion of the electronic document.

Additionally, the digital document annotation system 110 can also utilize annotator responses to annotation questions to generate a final dataset of digital annotations for an electronic document. For instance, the digital document annotation system 110 can utilize annotator responses from an annotator to annotation questions for an electronic document to evaluate how well the annotator comprehended the content of the electronic document. Indeed, the comprehension of the content of the electronic document can be an indicator of the annotator being reliable and/or accurate.

For example, in one or more embodiments, the digital document annotation system 110 can determine the number of correct annotator responses from the annotator responses corresponding to an annotator. Furthermore, the digital document annotation system 110 can determine a threshold number of required correct answers for an accurate and/or reliable annotator. Indeed, in some embodiments, the digital document annotation system 110 can determine if the number of correct annotator responses from the annotator is below the threshold number of required correct answers and, when the number of correct annotator responses is less than the threshold number, the digital document annotation system 110 can flag the annotator as performing poorly.

Additionally, in one or more embodiments, the digital document annotation system 110 can determine a percentage of correct annotator responses corresponding to an annotator for an electronic document and compare this percentage to a required threshold percentage. In way of example, if annotator 1 provided only one correct annotator response to five annotation questions asked (i.e., twenty percent correct) and the required threshold percentage is sixty percent, then the digital document annotation system 110 may flag annotator 1 as performing poorly.

In some embodiments, the digital document annotation system 110 can determine if the annotator response is correct or incorrect before utilizing the annotator responses to generate a final dataset of digital annotations. For instance, in some embodiments, the digital document annotation system 110 can compare annotator responses to a correct answer choice to determine if the annotator responses are correct or incorrect for a multiple-choice question. Additionally, for free-text questions, the digital document annotation system 110 can determine if the annotator response is semantically far from a model answer (i.e., the reference answer and/or the annotator answer provided in a question-answer pair user interface) for the annotation question to determine whether the annotator response is correct or incorrect. For example, the digital document annotation system 110 can compare an annotator response comprising a text answer to a reference answer to determine if specific words are used in the annotator response (i.e., a set of words that indicate that the annotator response is correct) to determine if the annotator response comprising the text answer is correct or incorrect. Moreover, the digital document annotation system 110 can utilize a word to vector algorithm to generate a first vector representation of the annotator response and a second vector representation of the correct answer. The digital document annotation system 110 can then compare the vectors (e.g., using cosine similarity) to determine if the annotator response is correct.

Moreover, in some embodiments, the digital document annotation system 110 can utilize tracked cursor movements to generate a final dataset of digital annotations for an electronic document. For instance, in one or more embodiments, the digital document annotation system 110 can utilize tracked cursor movements of an annotator to determine whether the annotator reviewed the text of the electronic document. In particular, in some embodiments, the digital document annotation system 110 analyzes the tracked cursor movements to determine if the annotator utilized the cursor to follow the text (i.e., an annotator moving the cursor along text while reading the text) in the electronic document. Indeed, the digital document annotation system 110 may flag an annotator is poorly performing if the annotator did not utilize the cursor in a sufficient threshold area in the electronic document.

Furthermore, in one or more embodiments, the digital document annotation system 110 can utilize the question-answer pairs from the annotator to determine a final dataset of digital annotations for an electronic document. For example, the digital document annotation system 110 can utilize the feedback received from one or more non-drafting annotators for a set of annotator questions drafted by an annotator to determine whether the drafting annotator reviewed the electronic document with accuracy and reliability. For example, the digital document annotation system 110 may flag the drafting annotator as poorly performing if the question-answer pairs provided by the annotator are below a threshold feedback rating (from other annotators). Moreover, in some embodiments, the question-answer pair feedback rating can be based on the number of times other annotators answer the annotator questions incorrectly.

Additionally, the digital document annotation system 110 can utilize annotation performance data to determine a final set of digital annotations for an electronic document in a variety of ways. As just mentioned above, the digital document annotation system 110 can utilize data from the annotation performance data individually to determine if an annotator is performing poorly. In some embodiments, the digital document annotation system 110 can determine the number of times an annotator is flagged to be poorly performing based on the annotation performance data and only utilize the digital annotations of the annotator if the annotator is flagged by the digital document annotation system 110 less than a threshold flag amount.

Moreover, in one or more embodiments, the digital document annotation system 110 can utilize a combination of the annotation performance data by weighting the different annotation performance data. For example, the digital document annotation system 110 can associate a larger weight to whether or not the annotator spent a time period reviewing the electronic document above the review threshold time and less weight on cursor movement actions and the annotator response correctness. Indeed, the digital document annotation system 110 may determine that an annotator is reliable and/or accurate even if the digital document annotation system 110 determines that an annotator spent a time period reviewing the document above the review threshold time, did not utilize cursor movements, and did not provide enough correct annotator responses (e.g., in embodiments where the time period spent is given more weight).

Furthermore, in some embodiments, the digital document annotation system 110 can utilize annotation performance data to determine if individual digital annotations are reliable and/or accurate. For instance, the digital document annotation system 110 can perform any of the above calculations for a specific portion of the electronic document where the digital annotation was created. Moreover, in some embodiments, the digital document annotation system 110 can utilize calculations, in accordance with the description above, to determine if the annotator responses corresponding to a digital annotation were correct. In one or more embodiments, the digital document annotation system 110 may provide financial rewards to annotators that are determined to be performing well based on their annotation performance data and the calculations described above.

As mentioned, the digital document annotation system 110 can utilize the annotation performance data to generate a final data set of digital annotations. For example, in some embodiments, the digital document annotation system 110 can determine if one or more annotators are performing poorly in accordance to the description above. Furthermore, in some embodiments, the digital document annotation system 110 filters the digital annotations by utilizing digital annotations for an electronic document from annotators that were not flagged to be performing poorly.

Additionally, in some embodiments, the digital document annotation system 110 can utilize the determined reliability and/or accuracy of individual digital annotations to filter the digital annotations that are determined to not be reliable and/or accurate based on the annotation performance data. For example, the digital document annotation system 110 can determine a first annotation of an electronic document from an annotator is reliable (e.g., where the annotator spent sufficient time on a portion of the document corresponding to the first annotation and the annotator answered a question corresponding to the first portion correctly) but determine a second annotation of an electronic document from the annotator is not reliable (e.g., where the annotator did not spend sufficient time on a portion of the document corresponding to the second annotation and the annotator answered a question corresponding to the second portion incorrectly).

As shown in FIG. 5, the digital document annotation system 110 receives annotator digital annotations 502a-502d for annotators 1, 2, 3, and 4 and utilizes an annotation performance data filter 506 to determine which of the annotator digital annotations 502a-502d are reliable and/or accurate. In particular, as shown in FIG. 5, the digital document annotation system 110 utilizes annotation performance data 504a-504d in the annotation performance data filter 506 to determine that annotator 1 (corresponding to digital annotations 502a) and annotator 3 (corresponding to digital annotations 502c) are reliable and/or accurate based on their annotation performance data. Furthermore, as a result, the digital document annotation system 110 utilizes digital annotations 502a and digital annotations 502c as the final data set of digital annotations for the corresponding electronic document.

As described above, the digital document annotation system 110 can filter annotations utilizing annotation performance data. Accordingly, the algorithms and acts described above in relation to FIG. 4 and FIG. 5 can comprise corresponding structure for performing a step for utilizing annotation performance data to filter the annotations.

Figure 6:
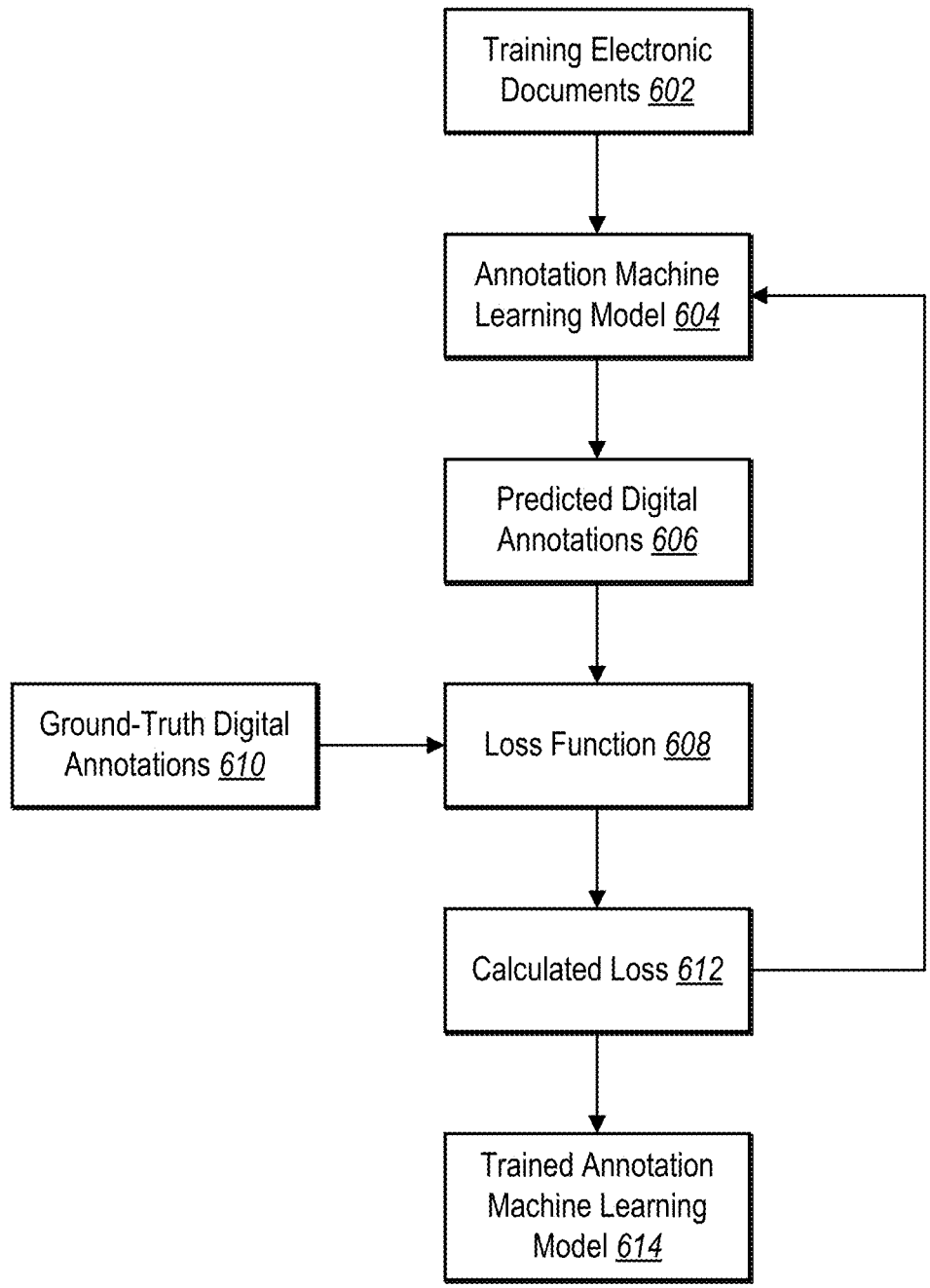
FIG. 6 illustrates a flow chart of training an annotation machine learning model in accordance with one or more embodiments.

As just mentioned, the digital document annotation system 110 can utilize the generated final digital annotations as ground-truth digital annotations to train a neural network to automatically generate digital annotations corresponding to significant sentences in an electronic document. For example, as shown in FIG. 6, the digital document annotation system 110 trains a digital annotation machine learning model to generate digital annotations in accordance with one or more embodiments. In particular, as illustrated in FIG. 6, the digital document annotation system 110 utilizes training electronic documents 602, predicted digital annotations 606, ground-truth digital annotations 610, and a calculated loss 612 to train the annotation machine learning model 604 and to generate the trained annotation machine learning model 614.

For instance, as shown in FIG. 6, the digital document annotation system 110 provides the training electronic documents 602. In one or more embodiments, the digital document annotation system 110 can provide the training electronic documents 602 from storage in server(s) 102. Additionally, the training electronic documents 602, in one or more embodiments, are the electronic documents associated with the ground-truth digital annotations 610 that are generated in accordance with the above description (e.g., the digital annotations 502*a* and 502*c*).

Furthermore, as illustrated in FIG. 6, the digital document annotation system 110 utilizes the training electronic documents 602 to train the annotation machine learning model 604. More specifically, the digital document annotation system 110 provides the training electronic documents 602 as input to the annotation machine learning model 604. In some embodiments, the annotation machine learning model 604 analyzes the training electronic documents 602 to predict digital annotations 606 for the training electronic documents 602.

Additionally, as shown in FIG. 6, the annotation machine learning model 604 utilizes the training electronic documents 602, the predicted digital annotations 606, and the ground-truth digital annotations 610 to learn to accurately generate digital annotations for an electronic document that correspond to significant sentences of the electronic document. For example, the digital document annotation system 110 compares the predicted digital annotations 606 and the ground-truth digital annotations 610 to train the annotation machine learning model 604. In particular, the digital document annotation system 110 compares the predicted digital annotations 606 and the ground-truth digital annotations 610 utilizing the loss function 608 (e.g., mean squared error loss function, cosine similarity loss function, or another loss function), which generates the calculated loss 612. In particular, the loss function 608 can determine if the predicted digital annotations 606 accurately reflect the ground-truth digital annotations 610 of the training electronic documents 602.

Furthermore, the annotation machine learning model 604 then utilizes the calculated loss 612 to train the annotation machine learning model 604 in automatically generating digital annotations that correspond to significant sentences of an electronic document. In particular, digital document annotation system 110 provides information from the calculated loss 612 to the annotation machine learning model 604 to adjust parameters of the annotation machine learning model 604. For instance, in some embodiments the digital document annotation system 110 back-propagates the calculated loss 612. In particular, the annotation machine learning model 604 can alter parameters such as weighting parameters to minimize the calculated loss 612.

In one or more embodiments, the digital document annotation system 110 utilizes the annotation machine learning model 604 to repeatedly generate predicted digital annotations 606, compares the predicted digital annotations 606 with the ground-truth digital annotations 610, and alters parameters to minimize the calculated loss 612. In some embodiments, the digital document annotation system 110 repeats this process until a termination condition (e.g., the calculated loss 612 is minimized past a threshold, a threshold number of iterations has been satisfied, or a threshold time has passed) to generate the trained annotation machine learning model 614. Indeed, the trained annotation machine learning model 614 can automatically generate digital annotations for electronic documents such as digital highlights and/or summaries for the electronic documents.

As mentioned above, the digital document annotation system 110 can also utilize the generated a final data set of digital annotations as ground-truth digital annotations to test annotation models that automatically generate digital annotations corresponding to significant sentences in an electronic document. For example, as shown in FIG. 7A, the digital document annotation system 110 utilizes ground-truth digital annotations and digital annotations generated by the annotation model to test the annotation model in accordance with one or more embodiments.

Figure 7A:
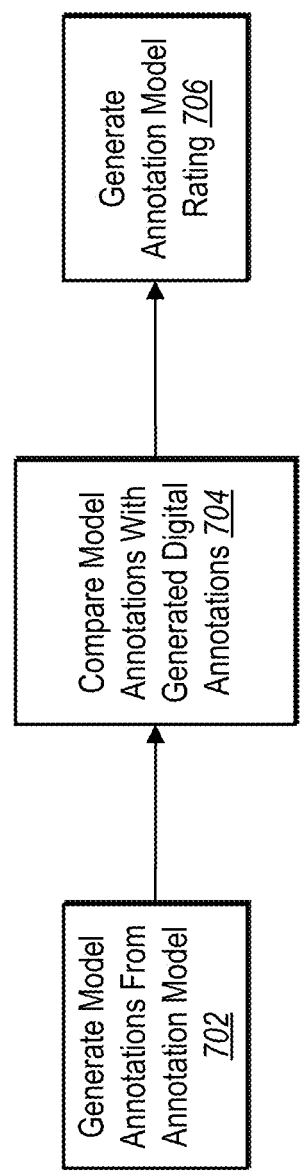
FIGS. 7A-7B illustrate flow diagrams of testing an annotation model in accordance with one or more embodiments.

For instance, as shown in FIG. 7A, the digital document annotation system 110 can utilize an annotation model to generate model digital annotations 702 for an electronic document. Furthermore, in some embodiments, the digital document annotation system 110 can receive model digital annotations generated by an annotation model from client device 112. In one or more embodiments, the annotation model can include Recollect, Sedona, and the SMMRY summarizer.

Additionally, as shown in FIG. 7A, the digital document annotation system 110 can compare the model annotations with the ground-truth digital annotations 704. For instance, the digital document annotation system 110 can determine the number of ground-truth digital annotations that are not present in the model annotations from the annotation model. In some embodiments, the digital document annotation system 110 can determine the number of model annotations that are not utilized in the ground-truth digital annotations.

As illustrated in FIG. 7A, the digital document annotation system 110 then generates an annotation model rating 706 for the annotation model. For example, in one or more embodiments, the digital document annotation system 110 can generate the annotation model rating 706 based on the comparison between the model annotations and the ground-truth digital annotations 704. For example, the digital document annotation system 110 can determine the annotation model rating by determining a percentage of accuracy based on the number of ground-truth digital annotations found within the model annotations generated by the annotation model. Additionally, in some embodiments, the digital document annotation system 110 can determine the annotation model rating can based on the percentage of accuracy and the number of extra, non-ground-truth digital annotations identified in the model annotations.

Figure 7B:
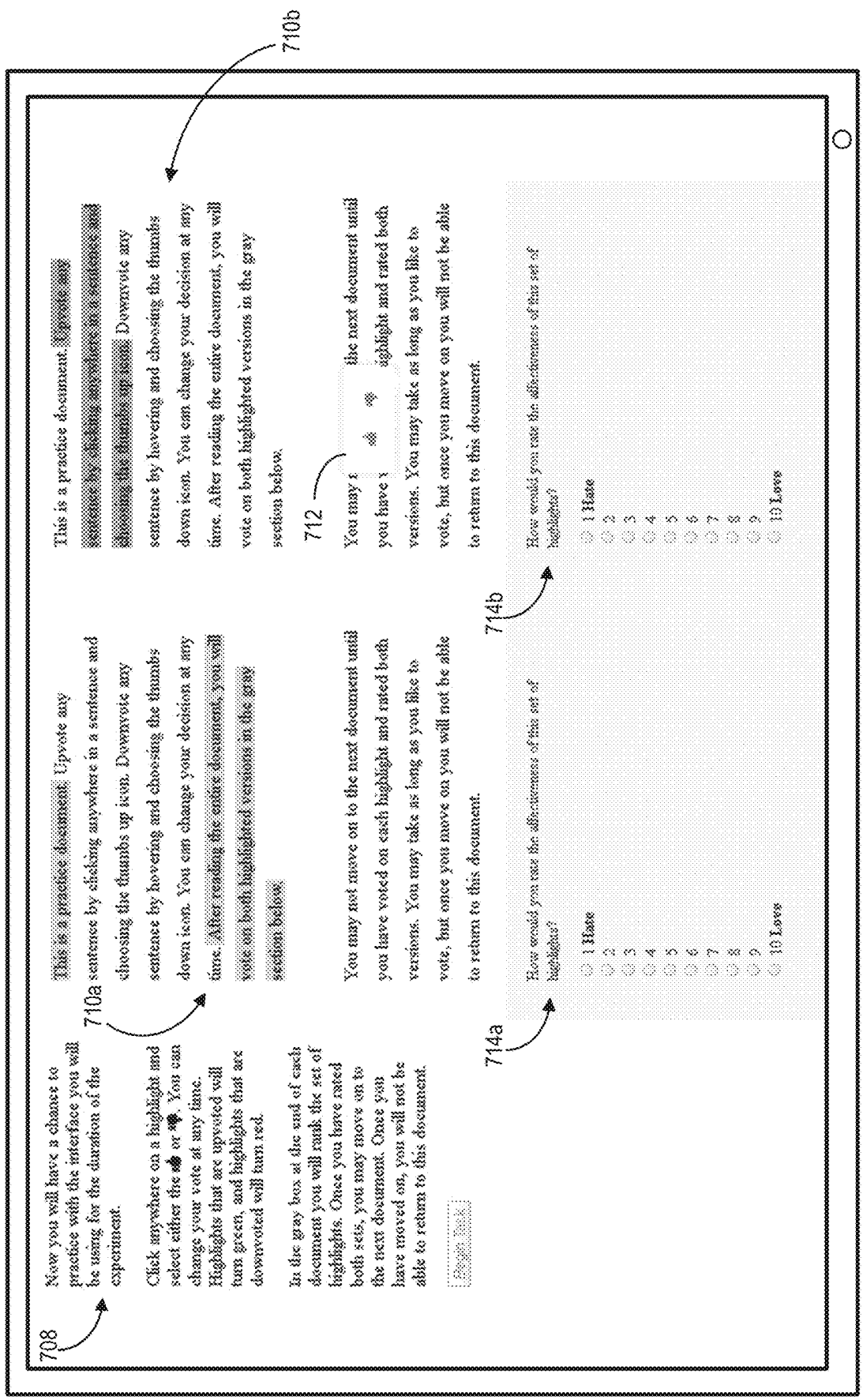

Furthermore, in one or more embodiments, the digital document annotation system 110 can utilize a pair-wise comparison to test an annotation model. Indeed, FIG. 7B illustrates a pair-wise comparison interface in accordance with one or more embodiments. For example, as shown in FIG. 7B, the digital document annotation system 110 can utilize a pair-wise comparison interface 708 to receive feedback from annotation reviewers to evaluate model annotations from an annotation model.

For instance, in some embodiments, the digital document annotation system 110 can provide model digital annotations generated by an annotation model 710a and ground-truth digital annotations 710b for an electronic document to an annotator client device 104n that has not reviewed the electronic document. Indeed, the digital document annotation system 110 can utilize the annotator client device 104n to display both electronic document content for model digital annotations 710a and ground-truth digital annotations 710b identically. Furthermore, the digital document annotation system 110 can anonymize the digital annotations displayed on the pair-wise comparison interface.

Furthermore, in one or more embodiments, the digital document annotation system 110 can utilize the pair-wise comparison user interface 708 on annotator client device 104n to receive annotation reviewer feedback. For example, in some embodiments, the digital document annotation system 110 can receive selections from the annotation reviewer when the annotation reviewer selects selectable feedback button 712 for each digital annotation in both the model digital annotations 710a and the ground-truth digital annotations 710b to indicate whether each digital annotation was helpful or not helpful. The digital document annotation system 110 can utilize the annotator client device 104n to display the selectable feedback button 712 when the annotation reviewer hovers a cursor over the digital annotation or touches the digital annotation. Furthermore, the digital document annotation system 110 can receive digital annotation ratings from the annotation reviewer based on the selectable rating option 714a and 714b. For instance, the digital document annotation system 110 can receive digital annotation ratings from the annotation reviewer when the annotation reviewer selects a rating 714a for the model digital annotations 710a and selects a rating 714b for the ground-truth digital annotations 710b. As shown in FIG. 7B, the selectable rating option 714a and 714b can be a selectable rating between the score of 1 and 10. In one or more embodiments, the digital document annotation system 110 can provide the pair-wise comparison user interface 708 with a variety of rating options. For instance, the selectable rating option can include a letter grade selection option and a free-text rating option.

Figure 8A:
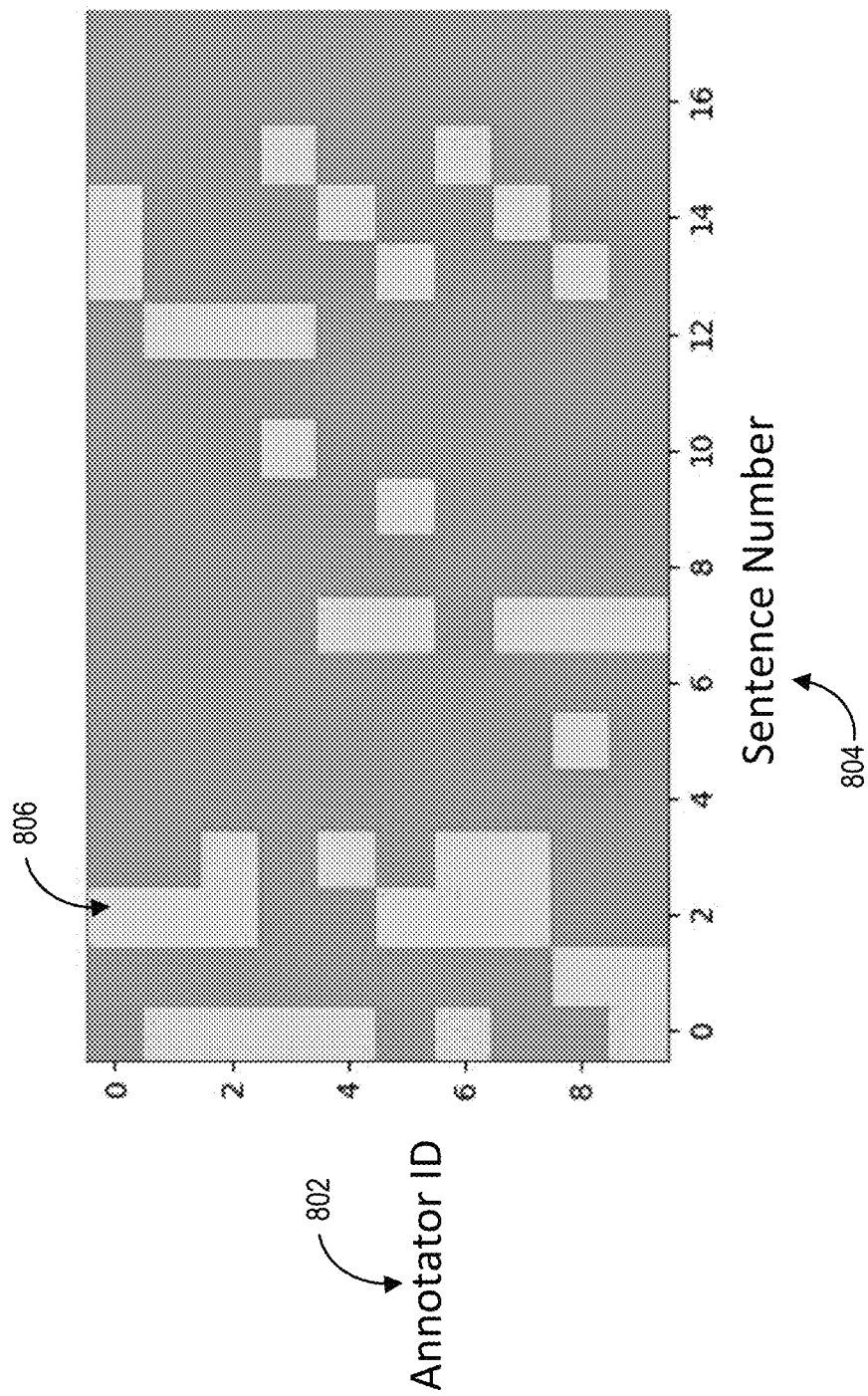
FIG. 8A-8C illustrate an annotation summary graph, an annotation feedback graph in accordance with one or more embodiments, and an annotation agreement score chart in accordance with one or more embodiments.
Figures 8B, 8C:
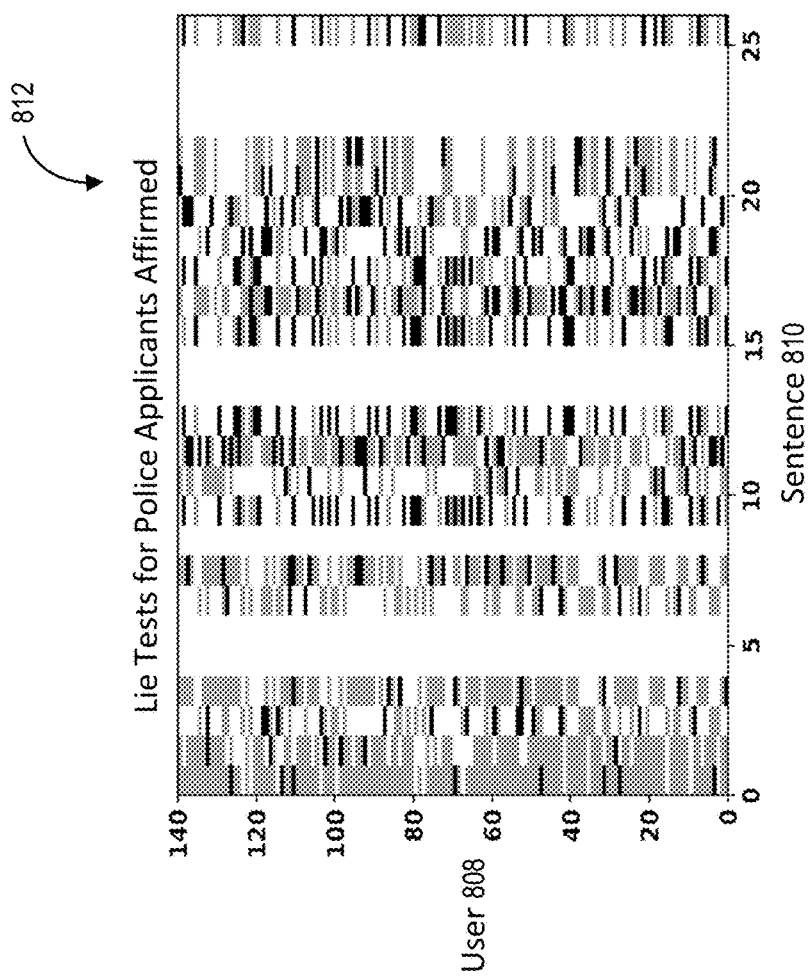

Furthermore, in one or more embodiments, the digital document annotation system 110 can provide one electronic document and one set of digital annotations for review at a time. For instance, the digital document annotation system 110 can utilize the annotator client device 104n of the annotation reviewer to display the model digital annotations and request a review of the model digital annotations by utilizing a selectable feedback button and a selectable rating option for the model annotations. Moreover, the digital document annotation system 110 can then utilize the annotator client device 104n to display the ground-truth digital annotations and request review of the ground-truth digital annotations from the annotation reviewer. Indeed, the digital document annotation system 110 can present the sets of digital annotations in any order. Furthermore, the digital document annotation system 110 can utilize only one of the sets of digital annotations to receive annotation reviewer feedback. Additionally, as shown in FIG. 8B below, the digital document annotation system 110 can represent the annotation reviewer feedback in a graph.

As just mentioned above, the digital document annotation system 110 can generate an annotation summary graph for digital annotations. For example, FIG. 8A illustrates the digital document annotation system 110 generating an annotation summary graph for digital annotations in accordance with one or more embodiments. In particular, in relation to FIG. 8A, the digital document annotation system 110 utilizes digital annotations from multiple annotators for an electronic document to generate an annotation summary graph. Additionally, as shown in FIG. 8A, the digital document annotation system 110 can utilize an annotation summary graph to indicate annotation agreement.

Indeed, the digital document annotation system 110 can utilize digital annotations from multiple annotators to generate an annotation summary graph. For example, as shown in FIG. 8A, the digital document annotation system 110 can generate an annotator ID axis 802 for the multiple annotators by referencing the annotators by annotator IDs corresponding to each annotator that provided digital annotations for an electronic document. In some embodiments, the annotator ID axis 802 can include every annotator that provided digital annotations for the electronic document referenced in the annotation summary graph to the digital document annotation system 110.

Furthermore, the digital document annotation system 110 can utilize sentences from the electronic document to generate the annotation summary graph. For example, as shown in FIG. 8A, the digital document annotation system 110 generates a sentence axis 804 for sentences in the electronic document. For instance, the digital document annotation system 110 can utilize sentence axis 804 to reference the sentences in the electronic document in a chronological order of when they appear in the electronic document (i.e., sentence 1, sentence 2, and so forth). In one or more embodiments, the digital document annotation system 110 can generate sentence axis 804 to reference sentences in the electronic document by a tag ID provided to each sentence in the electronic document. Moreover, in one or more embodiments, the digital document annotation system 110 can generate the sentence axis 804 to reference other information from the electronic document such as, but not limited to, portions of the electronic document, words in the electronic document, lines of an electronic document, and lines of an electronic document.

Additionally, the digital document annotation system 110 can utilize digital annotations from the multiple annotators to generate indicators for the annotation summary graph. For instance, as illustrated in FIG. 8A, the digital document annotation system 110 can generate indicators 806 to represent whether or not a digital annotation is present for a sentence from sentence axis 804 for each annotator from annotator ID axis 802. Indeed, as shown in FIG. 8A, the digital document annotation system 110 identifies that an annotator with an annotator ID of 0 has provided a digital annotation for sentence 2 from the electronic document and, as a result, generates an indicator (i.e., the lighter box) for annotator ID 0 at sentence 2 to represent that a digital annotation was provided. For instance, in one or more embodiments, the digital document annotation system 110 can utilize two colors for indicators 806 to represent whether a digital annotation exists or does not exist from annotators for each sentence.

In some embodiments, the digital document annotation system 110 can utilize the annotation summary graph to determine annotation agreement data. For example, as shown in FIG. 8A, the digital document annotation system 110 can determine annotation agreement by determining where there is a larger cluster of indicators 806 that represent that a digital annotation was provided. Indeed, if the indicators 806 present that a high number of annotators provided digital annotations for a sentence, then the digital document annotation system 110 can determine that the digital annotation comprises a high agreement rate. For instance, as shown in FIG. 8A, the digital document annotation system 110 generated a large cluster of indicators 806 for sentence 2. As a result, the digital document annotation system 110 can determine that there is strong annotation agreement amongst multiple annotators for sentence 2 from the electronic document.

Furthermore, the digital document annotation system 110 can represent the annotation summary graph in other forms to determine annotation agreement. In some embodiments, the digital document annotation system 110 can represent the annotation reviewer feedback in annotation feedback graphs. For example, as shown in FIG. 8B, the digital document annotation system 110 can generate a linear representation graph 812 to represent the annotation reviewer feedback in accordance with one or more embodiments. Indeed, the digital document annotation system 110 can generate the linear representation graph 812 to include an axis for multiple annotation reviewers 808 and an axis for each portion of the electronic document (i.e., a sentence, word, or digital annotation of the electronic document) 810. Additionally, the digital document annotation system 110 can generate the linear representation graph 812 to indicate whether there was a digital annotation with positive feedback, a digital annotation with negative feedback, or no digital annotation at each sentence of an electronic document from each annotation reviewer for one or more annotation models (i.e., the digital annotations generated by the digital document annotation system 110 and other annotation models). Indeed, the digital document annotation system 110 can utilize the linear representation graph 812 to determine annotation agreement by identifying sentences that comprise positive feedback from a large amount of annotation reviewers regardless of the annotation model reviewed. Moreover, the digital document annotation system 110 can represent the three possibilities with different colors (i.e., green to indicate positive feedback, red to indicate negative feedback, and cream to indicate a lack of digital annotation for a sentence).

Additionally, the digital document annotation system 110 can also generate a boxplot graph to represent vote distribution from annotation reviewers for model annotations from one or more annotation models and the ground-truth digital annotations. Indeed, the digital document annotation system 110 can generate the boxplot graph to compare the number of votes each annotation model and the ground-truth digital annotations received from the annotation reviewers.

Furthermore, in some embodiments, the digital document annotation system 110 can represent the annotation summary graph as a matrix. Indeed, in some embodiments, the digital document annotation system 110 can utilize a matrix of annotators and at which sentences the annotators provided digital annotations to calculate various scores. For instance, the digital document annotation system 110 can utilize the annotation summary graph (in matrix form) to calculate Krippendorff Alpha scores to measure annotation agreement across annotators for an electronic document. In addition, in some embodiments, the digital document annotation system 110 can also utilize Cohen's Kappa, Fleiss' Kappa, Scott's Pi, and Observation Agreement to calculate scores for annotation agreement. For example, as shown in FIG. 8C, the digital document annotation system 110 can provide an annotation agreement score chart that represents the above calculated scores for annotation agreement in accordance with one or more embodiments.

Additionally, the digital document annotation system 110 can utilize the determined annotation agreement for improvements to the digital document annotation system 110 and/or to generate ground-truth digital annotations for an electronic document. For example, the digital document annotation system 110 can utilize the determined annotation agreement to determine the number of annotators are required to obtain a high-quality data set of digital annotations. Indeed, the digital document annotation system 110 can filter digital annotations based on the determined annotation agreement score by only utilizing digital annotations that have an annotation agreement score above a threshold agreement score. Additionally, the digital document annotation system 110 can utilize the filtered digital annotations as the ground-truth digital annotations for an electronic document. Furthermore, the digital document annotation system 110 can provide the annotation summary graph and/or the determined annotation agreements to an administrator client device 112 (e.g., for review or user selection of ground-truth annotations).

As just mentioned above, the digital document annotation system 110 can provide an annotation user interface to the annotator client device 104a to identify digital annotations and annotation performance data from one or more annotators. For example, FIGS. 9A-9F illustrates the digital document annotation system 110 providing one or more annotation user interfaces to the annotator client device 104a in accordance to one or more embodiments. In particular, the digital document annotation system 110 provides an annotation user interface to an annotator that comprises instructions, selectable topic for annotator topic preferences, an electronic document with annotation functionalities, annotation questions, and a question-answer pair user interface.

Figure 9A:
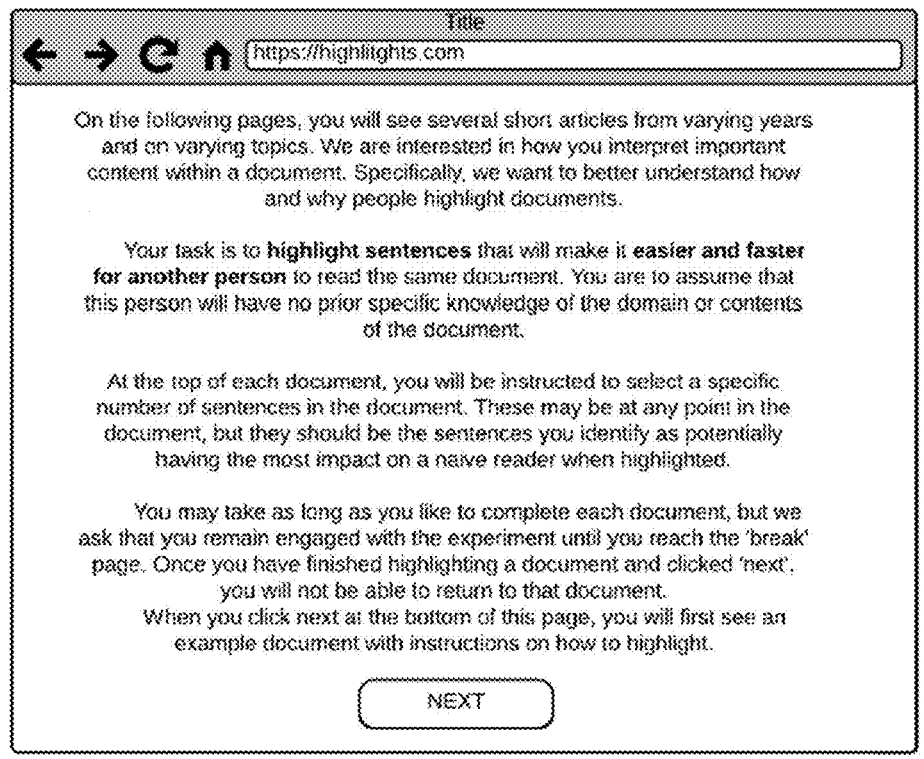
FIGS. 9A-9F illustrate exemplary user interfaces for collecting digital annotations and annotation performance data in accordance with one or more embodiments.

For example, (upon an annotator signing in) the digital document annotation system 110 can provide an annotation user interface to an annotator comprising instructions for reviewing and annotating an electronic document. In particular, FIG. 9A illustrates the digital document annotation system providing an annotation user interface comprising instructions for reviewing and annotating an electronic document. Indeed, the instructions can include the task requirements for an annotator and the motive behind collecting digital annotations from the annotator. In one or more embodiments, the digital document annotation system 110 provides instructions to increase the engagement and attention of an annotator to increase the likelihood that the annotator will provide accurate and/or reliable digital annotations for the electronic document.

Figure 9B:
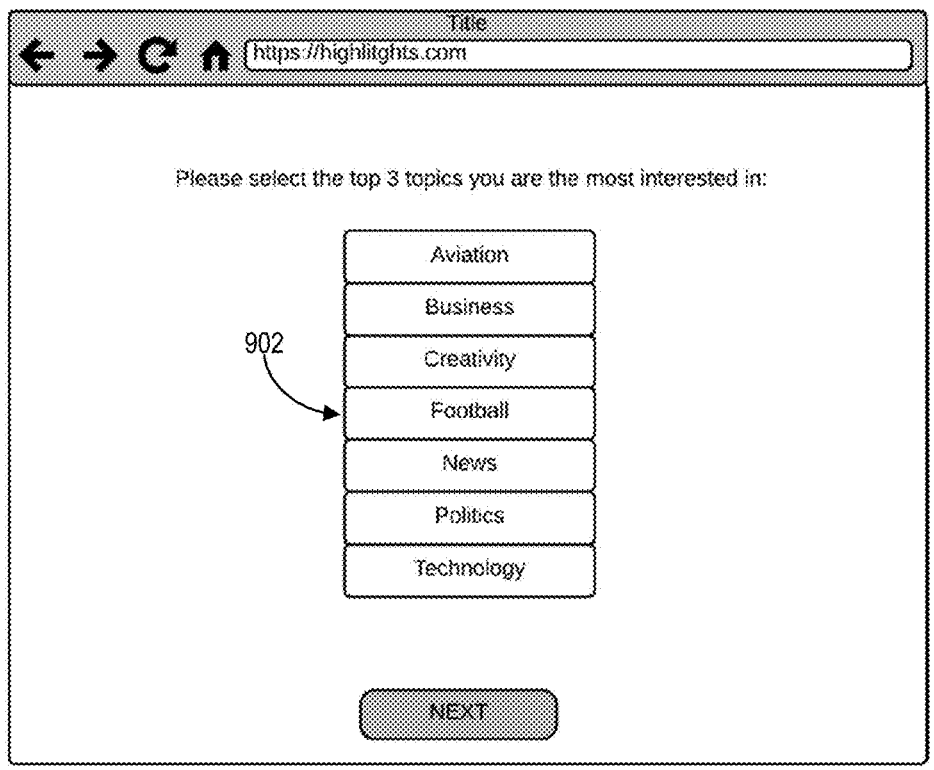

Furthermore, the digital document annotation system 110 can provide the annotator with selectable topics to determine the annotator topic preferences. For example, FIG. 9B illustrates the digital document annotation system 110 providing selectable topics 902 in order to determine the annotator topic preferences. Indeed, the digital document annotation system 110 identifies annotator interactions on the annotator client device 104a with the selectable topics 902 to determine the annotator topic preferences (e.g., in accordance with the description provided in relation to FIG. 3).

Figure 9C:
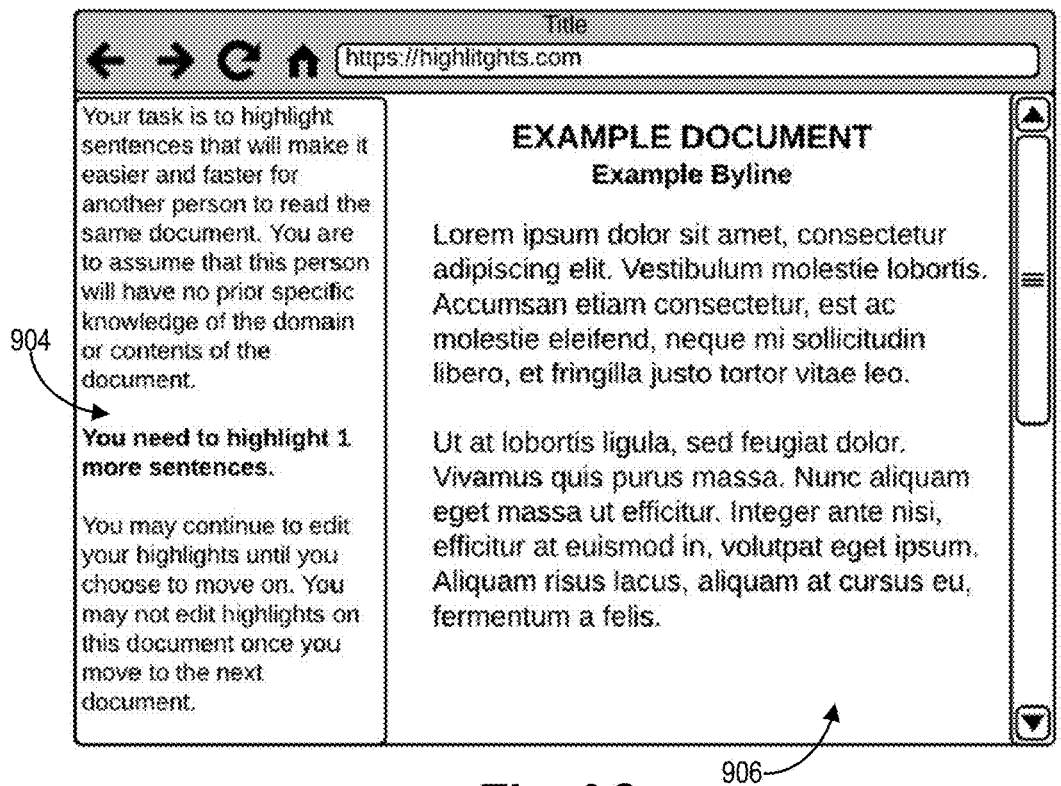

Additionally, the digital document annotation system 110 can provide the annotator with an electronic document (based on a topic selection from the selectable topics 902). For example, FIG. 9C illustrates the digital document annotation system 110 providing electronic document 906 for review from an annotator. Furthermore, the digital document annotation system 110 provides the electronic document 906 with electronic document instructions 904. The digital document annotation system 110 can also utilize the electronic document instructions 904 to indicate how many digital annotations the annotator must produce in the electronic document. Furthermore, the digital document annotation system 110 can provide an electronic document to the annotation user interface in FIG. 9C (e.g., in accordance with the description corresponding to FIG. 3).

Figure 9D:
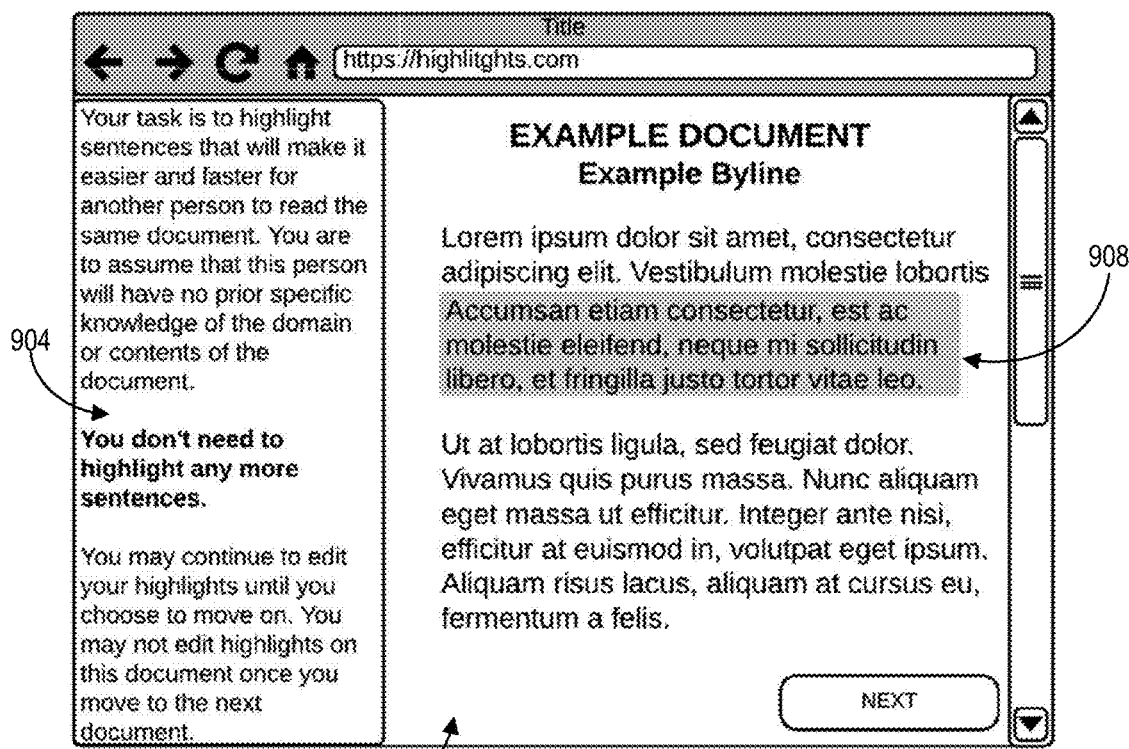

Moreover, the digital document annotation system 110 can generate and identify digital annotations for an electronic document. For example, FIG. 9D illustrates the digital document annotation system 110 providing an electronic document 906 to an annotator with digital annotation functionalities. For instance, as shown in FIG. 9D, the digital document annotation system 110 identifies annotator interactions with the annotation user interface to generate digital annotations such as a digital highlight 908 when the annotator left clicks on any portion of the sentence associated with digital highlight 908. Additionally, the digital document annotation system 110 utilizes the digital annotations and tracks other annotation performance data from the annotation user interface in FIG. 9D (e.g., in accordance with the description corresponding to FIG. 4).

Figure 9E:
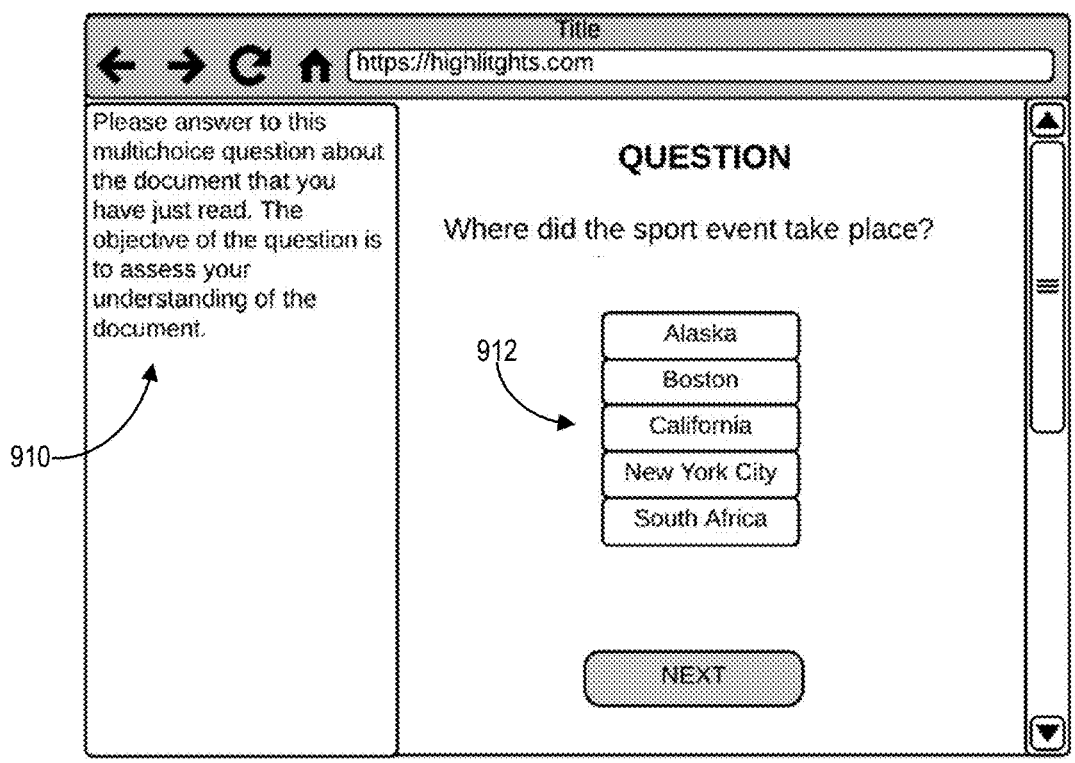

Furthermore, the digital document annotation system 110 can provide annotation questions to the annotator. For example, FIG. 9E illustrates the digital document annotation system 110 providing an annotation question 912 to an annotator. Indeed, as shown in FIG. 9E, the digital document annotation system 110 provides an annotation question 912 that includes a question and selectable answer choices. Moreover, the digital document annotation system 110 identifies annotator interactions with the selectable answer choices for annotation question 912 and records the selected answer choice. Furthermore, the digital document annotation system 110 provides instructions 910 for annotation questions to instruct an annotator on how to answer questions. Additionally, the digital document annotation system 110 utilizes the annotation question 912 and tracks other annotation performance data from the annotation user interface in FIG. 9E (e.g., in accordance with the description corresponding to FIG. 4).

Figure 9F:
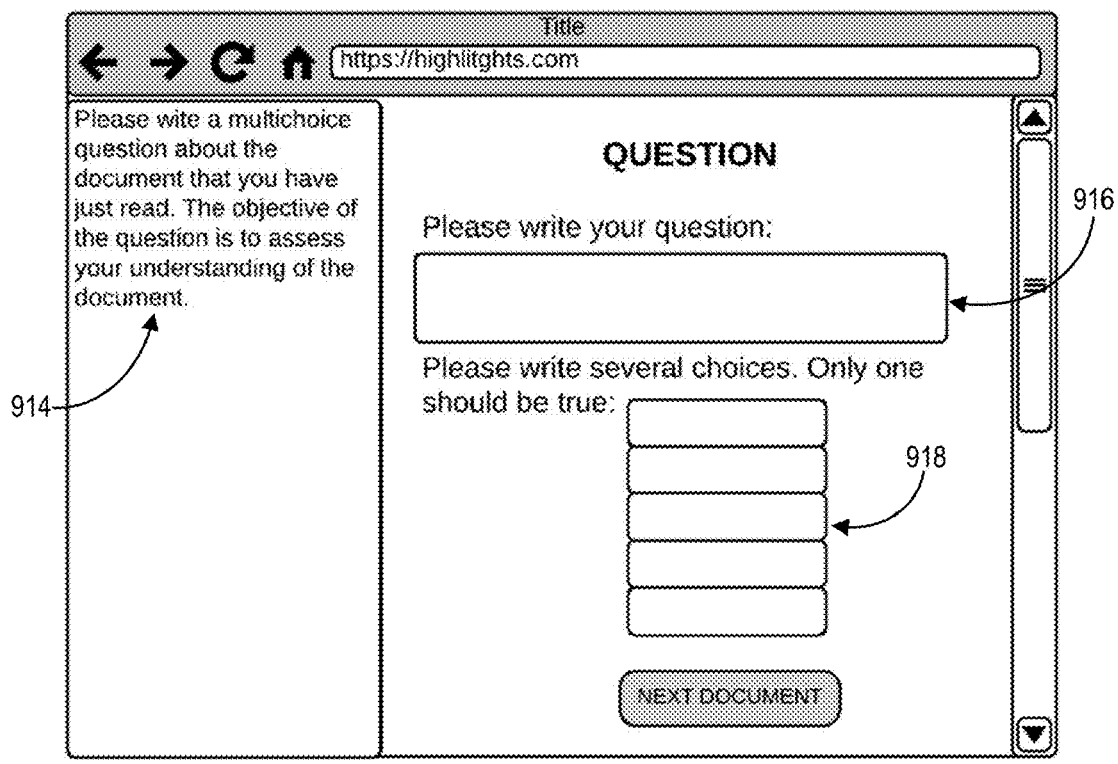

Moreover, the digital document annotation system 110 can provide a question-answer pair user interface to the annotator. For instance, FIG. 9F illustrates the digital document annotation system 110 providing a question-answer pair user interface to an annotator comprising a question text box 916 and answer text boxes 918. Indeed, the digital document annotation system 110 identifies annotator interactions with the question text box 916 and the answer text boxes 918 and records the annotator question and annotator answers. Furthermore, the digital document annotation system 110 provides question-answer pair user interface instructions 914 to instruct an annotator on how to draft an annotator question and annotator answers. Additionally, the digital document annotation system 110 can utilize the question-answer pair user interface and track other annotation performance data from the annotation user interface in FIG. 9F (e.g., in accordance with the description corresponding to FIG. 4).

The annotation user interface in FIGS. 9A-9F provide an improved user interface to efficiently generate digital annotations and annotation performance data. The digital document annotation system 110 can utilize the annotation user interface in FIGS. 9A-9F to collect digital annotations from multiple annotators and annotation performance data to generate ground-truth digital annotations with less time and resources. Indeed, unlike some conventional systems that require expert annotators to generate reliable and/or accurate digital annotations for an electronic document, the annotation user interface provided by the digital document annotation system 110 can generate reliable and/or accurate digital annotations from annotators (even annotators that are not experts).

As described above, the digital document annotation system 110 can improve accuracy relative to conventional systems. Researchers performed experiments using the digital document annotation system 110 to establish this improved accuracy. For the experiments, the researchers presented two different highlighted versions of the same electronic document (i.e., documents from the DUC dataset) to individuals. Researchers presented documents with highlighting form the digital document annotation system 110, documents with highlighting from summarization models Recollect, Sedona, and the SMMRY summarizer, and documents with other crowd-sourced highlighting. The highlighted versions were presented to two batches of users, both consisting of 140 Amazon Mechanical Turk users with the same English fluency requirement as the digital document annotation system 110 annotators. Additionally, the users utilized for the experiments were different from the annotators utilized by the digital document annotation system 110 to generate the ground-truth digital annotations. The users were instructed to provide user feedback and rankings for the highlights generated by the digital document annotation system 110 and the other summarization models mentioned above by utilizing the pair-wise comparison user interface in FIG. 7B. The experiments were used to gauge the impact of various digital annotation models on user preferences for highlighted documents.

Figure 10A:
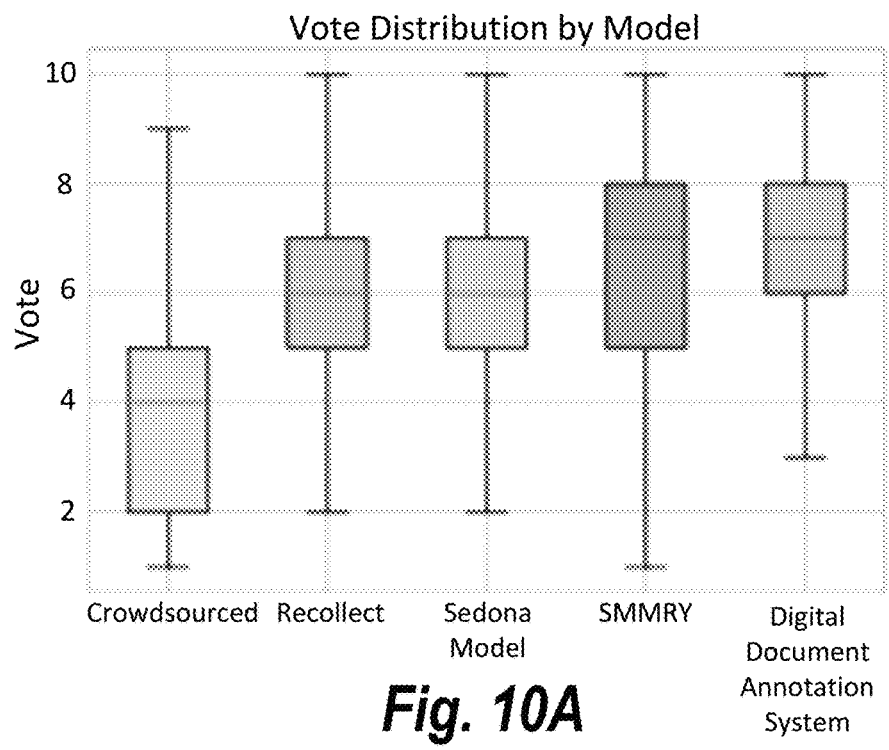
FIGS. 10A-10C illustrate experimental results of a digital document annotation system in accordance with one or more embodiments.
Figure 10B:
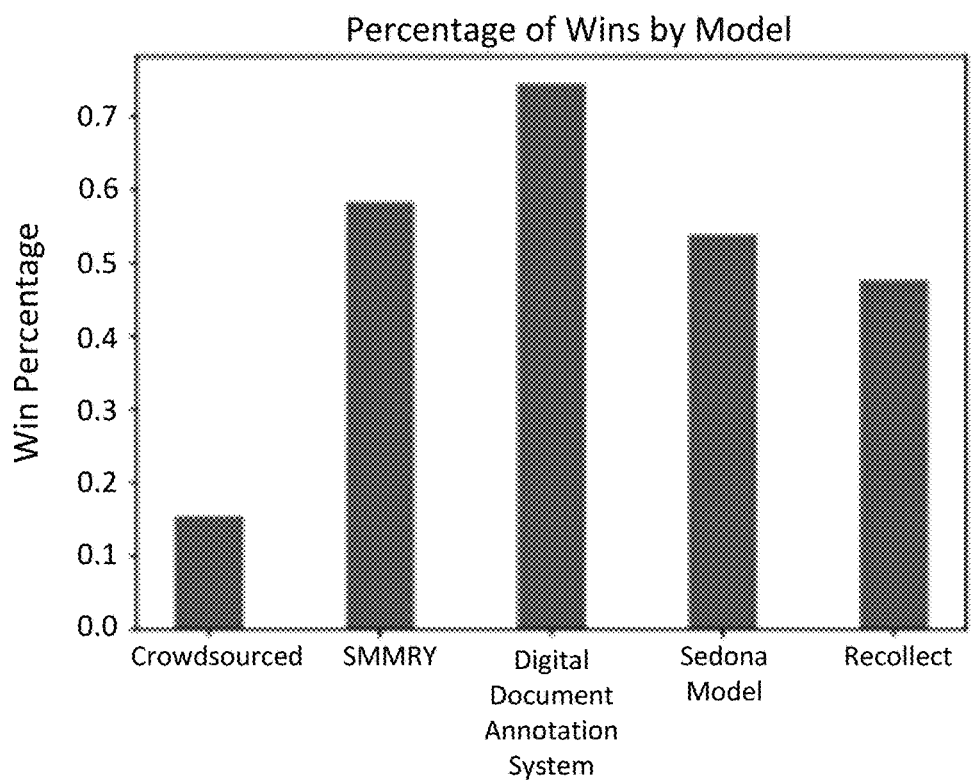
Figure 10C:
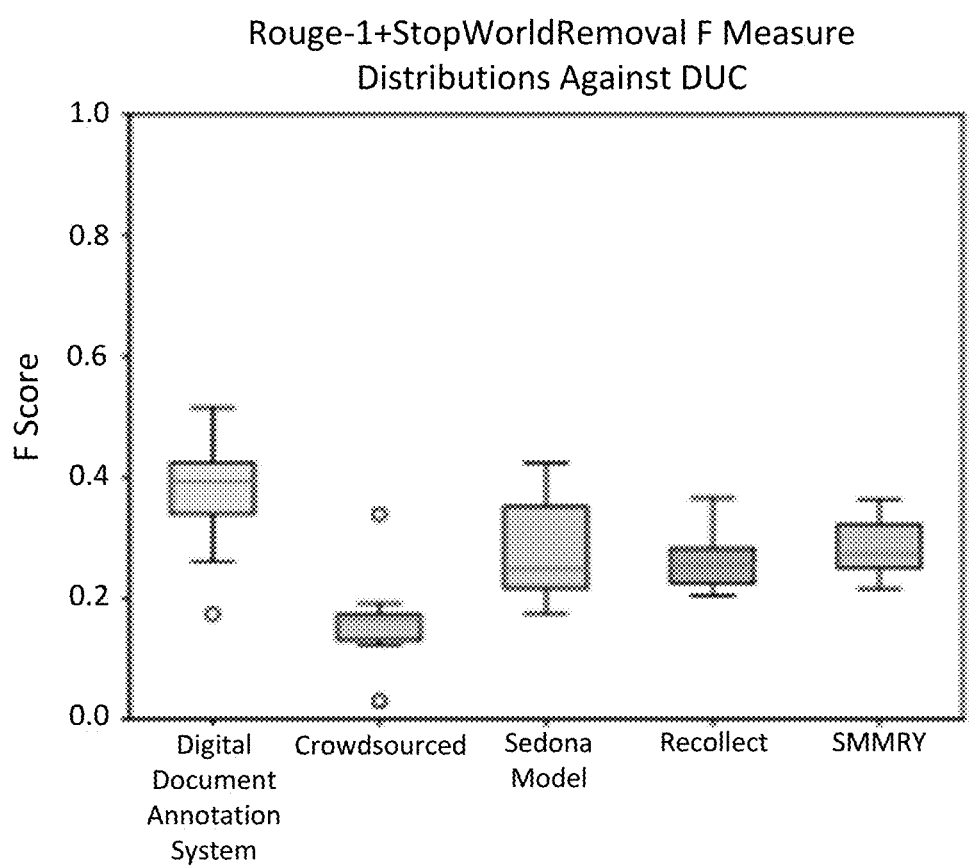

For instance, the results from the above experiments, as illustrated in FIG. 10A-10C, indicated that readers preferred the highlighted version from the digital document annotation system 110 over the other highlighted versions. Indeed, as illustrated in FIG. 10A, the highlighted version from the digital document annotation system 110 received more votes from the users compared to the other highlighted versions from the other annotation models in a vote distribution graph. Additionally, as shown in FIG. 10B, the experiments gathered the percentage of times each highlighted version wins (i.e., received the highest rating from a user), normalized by the amount of views each particular highlighted version received. Indeed, the ground-truth digital annotations generated by the digital document annotation system 110 had a higher win percentage when presented to the users compared to the other highlighted versions from the other annotation models.

Additionally, the experiments utilized ROUGE metrics to analyze the ground-truth digital annotations from the digital document annotation system 110 and the other annotation models. For example, the experiments utilized a human generated and standardized summary that is included with each electronic document from the DUC dataset as the gold version for ROUGE comparisons. Furthermore, the highlighted sentences generated by the digital document annotation system 110 and the other annotation models are compared to the gold version summary. For instance, the ROGUE metric measures the number of overlapping words between the gold summary and the highlighted sentences from the digital document annotation system 110 and the other annotation models. The experiments, as shown in FIG. 10C, resulted in the average F score, based on a ROUGE metric with 1+Stop Word Removal, for annotations generated by the digital document annotation system 110 being higher than the average F scores for the other annotation models. Indeed, having a higher ROGUE metric score indicates that annotations generated by the digital document annotation system 110 represent a more accurate and/or reliable set of digital annotations compared to conventional systems.

Additionally, the measures utilized in the experiments above can also be utilized to test annotation models in accordance with FIGS. 7A-7B. For instance, the digital document annotation system 110 can determine information such as vote distributions, percentage of wins, ROUGE metrics, METEOR metrics, and/or cosine similarity metrics for model annotations provided by annotation models in FIGS. 7A-7B and the annotations generated by the digital document annotation system 110. Indeed, the digital document annotation system 110 can test the annotation models by utilizing the calculated metric scores to modify the annotation models until the annotation models result in metric scores similar to the annotations generated by the digital document annotation system 110.

Figure 11:
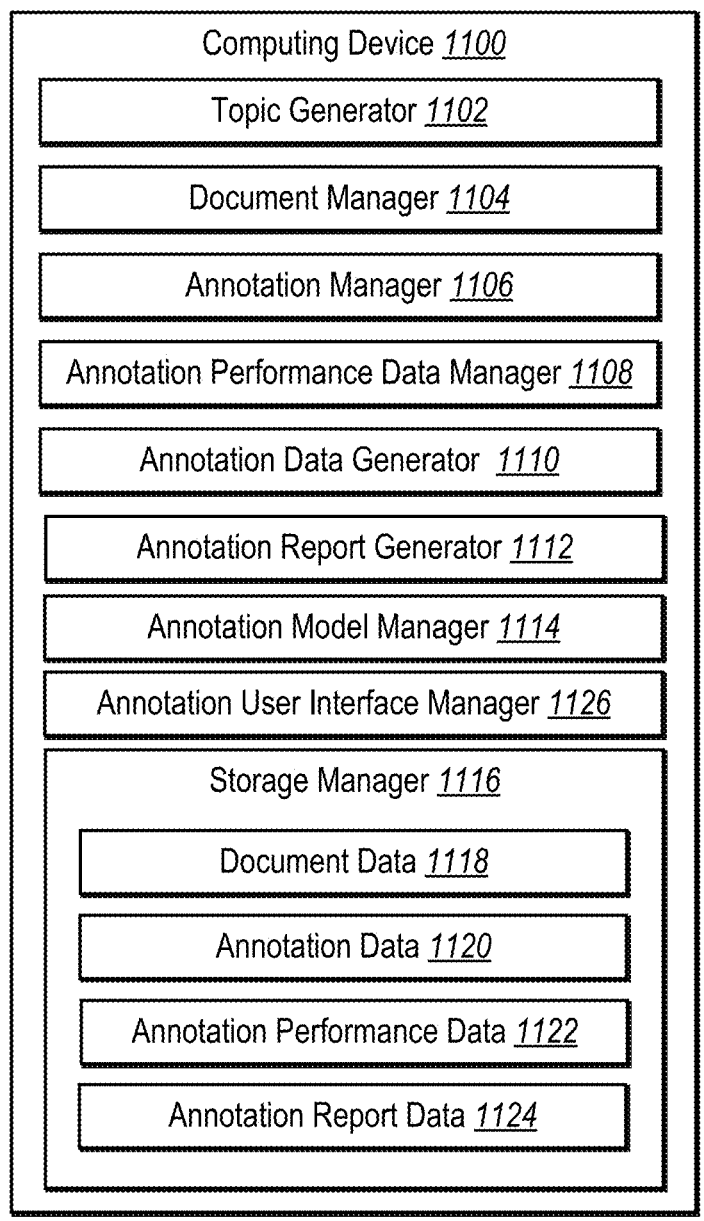
FIG. 11 illustrates a schematic diagram of a digital document annotation system in accordance with one or more embodiments.

Turning now to FIG. 11, additional detail will be provided regarding components and capabilities of one example architecture of the digital document annotation system 110. As shown in FIG. 11, the digital document annotation system 110 may be implemented on a computing device 1100 (e.g., the server(s) 102 and/or the annotator client device 104a). In particular, the computing device 1100 can implement the digital document annotation system 110 with a topic generator 1102, a document manager 1104, an annotation manager 1106, an annotation performance data manager 1108, an annotation data generator 1110, an annotation report generator 1112, an annotation model manager 1114, an annotation user interface manager 1126, and a storage manager 1116 (that includes document data 1118, annotation data 1120, annotation performance data 1122, and annotation report data 1124). Furthermore, the annotator client device 104a can implement and a storage manager 1128 (that includes annotation user interface data 1130).

As just mentioned, and as illustrated in FIG. 11, the digital document annotation system 110 includes topic generator 1102. The topic generator 1102 can determine, select, generate, and/or receive one or more topics for one or more electronic documents. In particular, the topic generator 1102 can determine annotator topic preferences for one or more annotators to select and provide one or more electronic documents to the one or more annotators. More specifically, the topic generator 1102 can determine topic preferences for an annotator based on annotator profiles, annotator selections, and/or annotation performance data.

Furthermore, the topic generator 1102 can analyze, determine, identify, access, and/or select a topic for an electronic document. For instance, the topic generator 1102 can analyze an electronic document to determine a main topic from the content of the electronic document. More specifically, the topic generator 1102 can determine a topic for an electronic document based on a topic modelling algorithm such as a latent Dirichlet allocation model.

As illustrated in FIG. 11, the digital document annotation system 110 also includes a document manager 1104. The document manager 1104 can determine, identify, access, and/or select an electronic document for an annotator. For example, the document manager 1104 can determine one or more electronic documents to provide to an annotator based on an annotator topic preference. In particular, the document manager 1104 can determine one or more electronic documents for an annotator based on comparing the topics of the one or more electronic documents with the annotator topic preferences and selecting the electronic documents where there is a topic match. Furthermore, the document manager can provide the determined one or more electronic documents to the annotator.

Moreover, as illustrated in FIG. 11, the digital document annotation system 110 also includes annotation manager 1106. For instance, the annotation manager 1106 can identify, determine, generate, access, and/or receive one or more digital annotations for an electronic document. In particular, the annotation manager 1106 can identify one or more digital annotations generated on an electronic document by an annotator. More specifically, the annotation manager 1106 can identify one or more digital annotations for an electronic document based on user interactions of an annotator on an annotation user interface. For example, the annotation manager 1106 can identify digital annotations such as digital highlights, notes, and summaries.

As illustrated in FIG. 11, the digital document annotation system 110 also includes annotation performance data manager 1108. The annotation performance data manager 1108 can identify, determine, generate, collect, track, record, and/or receive annotation performance data for an annotator. In particular, the annotation performance data manager 1108 can identify annotation performance data for an annotator while the annotator generates digital annotations for an electronic document. For example, the annotation performance data manager 1108 can track annotation performance data based on annotator interactions with an annotation user interface while the annotator generates digital annotations for an electronic document.

Moreover, the annotation performance data manager 1108 can identify annotation performance data from an annotator in various forms. For example, the annotation performance data manager 1108 can determine annotation performance data such as time periods, scroll actions, cursor actions, annotator responses, annotation questions, eye tracking data, annotator profile data, and/or any other annotator interactions with the electronic document and digital annotations created by an annotator. Additionally, the annotation performance data manager 1108 can also identify annotation performance data from a question-answer pair user interface that generates annotator questions and annotator answers.

As illustrated in FIG. 11, the digital document annotation system 110 also includes annotation data generator 1110. The annotation data generator 1110 can generate, filter, determine, and/or identify annotation data, such as ground-truth annotation data, from digital annotations identified by one or more annotators. In particular, annotation data generator 1110 can generate a final annotation data set based on digital annotations identified by one or more annotators and the annotation performance data for the one or more annotators. More specifically, the annotation data generator 1110 can generate a final annotation dataset by determining one or more reliable and/or accurate annotators by filtering the annotators based on the annotation performance data.

Indeed, the annotation data generator 1110 can generate a final set of digital annotations by utilizing the annotation performance data in various methods. For instance, the annotation data generator can generate a final set of digital annotations by utilizing time thresholds to determine the reliability and/or accuracy of an annotator and/or a digital annotation. Additionally, the annotation data generator 1110 can generate a final set of digital annotations by utilizing scrolling actions to determine the reliability and/or accuracy of an annotator and/or a digital annotation. Furthermore, the annotation data generator 101 can also generate a final set of digital annotations by evaluating annotator responses to annotation questions for an annotator. Indeed, the annotation data generator 1110 can also generate a final set of digital annotations by utilizing cursor movements and/or question-answer pairs.

Moreover, as illustrated in FIG. 11, the digital document annotation system 110 can include an annotation report generator 1112. The annotation report generator 1112 can generate annotation summary graphs from digital annotations, as described above. For example, the annotation report generator can create annotation summary graphs, linear representation graphs, or annotation agreement charts.

Additionally, as illustrated in FIG. 11, the digital document annotation system 110 can include an annotation model manager 1114. The annotation model manager 1114 can train, teach, guide, and/or tune a machine learning model. In particular, the annotation model manager 1114 can train a machine learning model to automatically generate and/or predict digital annotations for an electronic document. Indeed, the annotation model manager 1114 can train the machine learning model, such as a neural network, by providing and/or utilizing ground-truth annotation data generated by the digital document annotation system 110. For instance, the annotation model manager 1114 can train a neural network by comparing the predicted digital annotations of the neural network with the ground-truth digital annotation data.

Moreover, the annotation model manager 1114 can evaluate, compare, update, and/or test annotation models. The annotation model manager 1114 can test annotation models by utilizing the ground-truth digital annotations. For instance, the annotation model manager 1114 can compare the digital annotations generated by an annotation model with the ground-truth digital annotations generated by the digital document annotation system 110. Additionally, the annotation model manager 1114 can test annotation models by providing and/or utilizing a pair-wise comparison user interface to identify, determine, and/or receive annotation reviewer feedback and ratings for both digital annotations from an annotation model and the ground-truth digital annotations. Furthermore, the annotation model manager 1114 can test annotation models by utilizing the annotation agreement data and annotation summary graphs to compare the ground-truth digital annotations with the model annotations.

As mentioned above, and as illustrated in FIG. 11, the digital document annotation system 110 also includes the annotation user interface manager 1126. The annotation user interface manager 1126 can access, identify, display, generate, and/or provide electronic documents for display to an annotator. Furthermore, the annotation user interface manager 1126 can detect annotator interactions to generate, display, and/or identify digital annotations for electronic documents. Furthermore, the annotation user interface manager 1126 can track, record, transmit, and/or generate annotation performance data from an annotator. In particular, the annotation user interface manager 1126 can track annotator interactions to determine annotation performance data and provide annotation performance data to annotation performance data manager 1108.

As illustrated in FIG. 11, the digital document annotation system 110 also includes the storage manager 1116. The storage manager 1116 maintains data for the digital document annotation system 110. The storage manager 1116 can maintain data of any type, size, or kind as necessary to perform the functions of the digital document annotation system 110. The storage manager 1116, as shown in FIG. 11, includes the document data 1118, the annotation data 1120 (e.g., digital highlights, digital comments for an electronic document, digital underlines, and other digitally drawn markings on an electronic document), the annotation performance data 1122 (e.g., time periods, scroll actions, cursor actions, annotator responses, annotation questions, eye tracking data, annotator profile data), and the annotation report data 1124 (e.g., annotation summary graphs and annotation agreement data).

Each of the components 1102-1126 of the digital document annotation system 110 and their corresponding elements (as shown in FIG. 11) may be in communication with one another using any suitable communication technologies. It will be recognized that although components 1102-1126 and their corresponding elements are shown to be separate in FIG. 11, any of components 1102-1126 and their corresponding elements may be combined into fewer components, such as into a single facility or module, divided into more components, or configured into different components as may serve a particular embodiment.

The components 1102-1126 and their corresponding elements can comprise software, hardware, or both. For example, the components 1102-1126 and their corresponding elements can comprise one or more instructions stored on a computer-readable storage medium and executable by processors of one or more computing devices. When executed by the one or more processors, the computer-executable instructions of the digital document annotation system 110 can cause a client device and/or a server device to perform the methods described herein. Alternatively, the components 1102-1126 and their corresponding elements can comprise hardware, such as a special purpose processing device to perform a certain function or group of functions. Additionally, the components 1102-1126 and their corresponding elements can comprise a combination of computer-executable instructions and hardware.

Furthermore, the components 1102-1126 of the digital document annotation system 110 may, for example, be implemented as one or more stand-alone applications, as one or more modules of an application, as one or more plug-ins, as one or more library functions or functions that may be called by other applications, and/or as a cloud-computing model. Thus, the components 1102-1126 of the digital document annotation system 110 may be implemented as a stand-alone application, such as a desktop or mobile application. Furthermore, the components 1102-1126 of the digital document annotation system 110 may be implemented as one or more web-based applications hosted on a remote server. Alternatively or additionally, the components of the digital document annotation system 110 may be implemented in a suit of mobile device applications or "apps." To illustrate, the components of the digital document annotation system 110 may be implemented in a digital document management application, including but not limited to ADOBE DOCUMENT CLOUD or ADOBE ACROBAT. "ADOBE," "DOCUMENT CLOUD," and "ACROBAT" are either registered trademarks or trademarks of Adobe Systems Incorporated in the United States and/or other countries.

FIGS. 1-11, the corresponding text, and the examples, provide a number of different systems, methods, and non-transitory computer readable media for generating ground-truth digital annotations for an electronic document that reliably and accurately correspond to significant sentences in the electronic document. In addition to the foregoing, embodiments can also be described in terms of a series of acts for accomplishing a particular result. For example, FIG. 12 illustrates a flowchart of a series of acts 1200 for generating ground-truth digital annotations for an electronic document in accordance with one or more embodiments.

Figure 12:
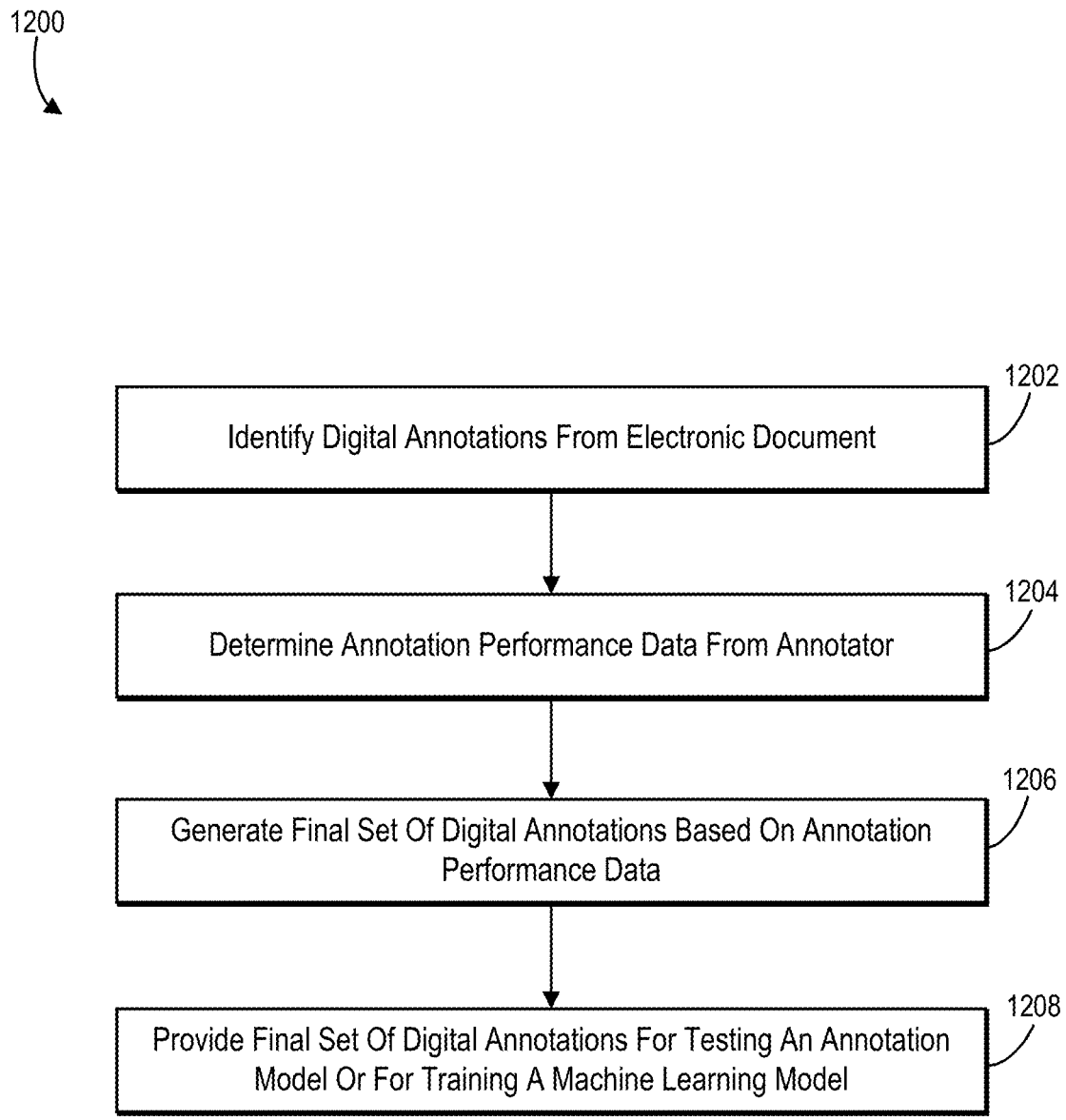
FIG. 12 illustrates a flowchart of a series of acts for generating a final set of digital annotations based on annotation performance data in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As illustrated in FIG. 12, the series of acts 1200 includes an act 1202 of identifying digital annotations from electronic documents. In particular, the act 1202 can include identifying a plurality of digital annotations. In addition, the act 1202 can also include identifying a plurality of digital annotations that are generated for an electronic document via a client device of an annotator.

Moreover, the act 1202 can also include determining annotator document topic preferences for the annotator based on user interactions by the annotator via the client device. Additionally, the act 1202 can also include providing the electronic document to the client device of the annotator for generating the one or more digital annotations based on the annotator document topic preferences. In one or more embodiments, the digital annotations comprise highlights within the electronic documents.

As illustrated in FIG. 12, the series of act 1200 include an act 1204 of determining annotation performance data from an annotator. In particular, the act 1204 can include determining annotation performance data via the client device. Furthermore, the act 1204 can include providing one or more digital annotation questions to the client device of the annotator. The annotation performance data can comprise a time period spent by the client device of the annotator in generating one or more digital annotations and annotator responses to one or more digital annotation questions. The act 1204 can include determining the annotation performance data via the client device by identifying a number of correct annotator responses.

Additionally, the act 1204 can include determining the annotation performance data via the client device by comparing a first time period spent by the client device in relation to a first portion of the electronic document with a review threshold time. Furthermore, the act 1204 can include determining the annotation performance data by identifying a portion of the electronic document that the annotator did not view based on scroll actions of the client device of the annotator.

Furthermore, the act 1204 can include providing a digital question-answer pair user interface to the client device of the annotator. The act 1204 can also include identifying an annotator digital question and an annotator digital answer of the annotator for the electronic document based on user interactions with the digital question-answer pair user interface. Additionally, the act 1204 can include providing the annotator digital question to a second client device of a second annotator and determining the annotation performance data of the annotator based on user interactions from the second client device corresponding to the annotator digital question. In addition, the act 1204 can include identifying an annotator response of the second annotator to the annotator digital question via the second client device and determining the annotation performance data for the annotator by comparing the annotator response of the second annotator to the annotator digital answer of the annotator.

As illustrated in FIG. 12, the series of act 1200 include an act 1206 of generating a final set of digital annotations based on annotation performance data. In particular, the act 1206 can include generating and/or filtering the final set of digital annotations from the plurality of digital annotations based on the annotation performance data including the time period spent by the client device of the annotator in generating the one or more digital annotations and the annotator responses to the one or more digital annotation questions. Furthermore, the act 1206 can include generating the final set of digital annotations based on the number of correct annotator responses.

As illustrated in FIG. 12, the series of act 1200 include an act 1208 of providing the final set of digital annotations for testing an annotation model or for training a machine learning model (e.g., an annotation model). In particular, the act 1208 can include providing the final set of digital annotations for utilization in at least one of: testing an annotation model or training a machine learning model to generate document annotations. In addition, the act 1208 can include providing electronic documents to the machine learning model to predict the digital annotations and comparing the predicted digital annotations with the filtered annotations to generate a calculated loss. Furthermore, the act 1208 can include training the machine learning model based on the calculated loss.

Additionally, the act 1208 can include generating a plurality of model annotations for the electronic document utilizing the annotation model. Furthermore, the act 1208 can include testing the annotation model by comparing the plurality of model annotations with the final set of digital annotations.

The act 1208 can also include providing a digital annotation summary graph for display to an administrator device. In particular, the act 1208 can include providing a digital annotation summary graph that includes a first axis, a second axis, and indicators. The first axis can correspond to different portions of the electronic document. Additionally, the second axis can correspond to a plurality of annotators. Moreover, the indicators within the digital annotation summary graph can reflect annotations of the plurality of annotators for the different portions for the electronic document.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
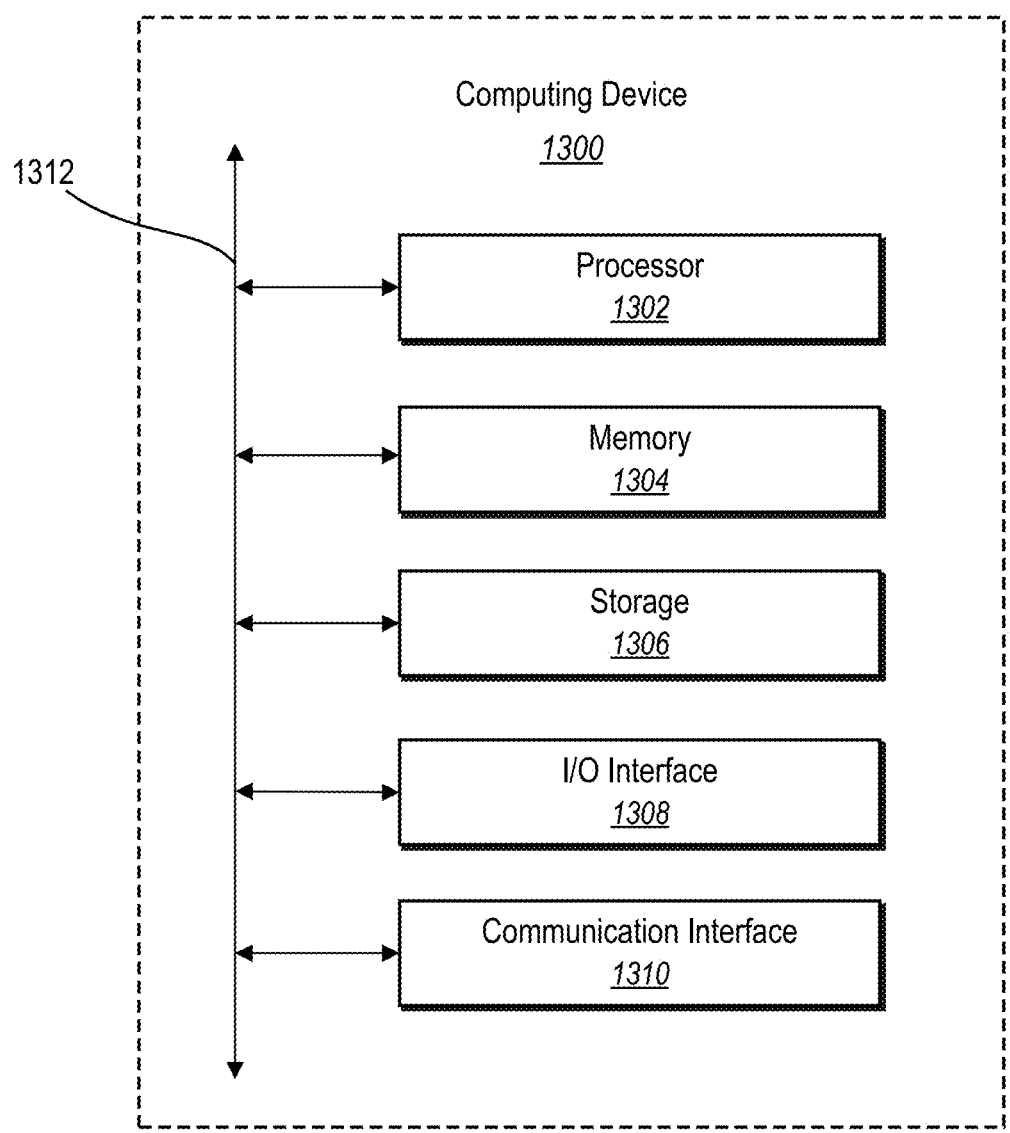
FIG. 13 illustrates a block diagram of an exemplary computing device in accordance with one or more embodiments.

FIG. 13 illustrates a block diagram of an exemplary computing device 1300 that may be configured to perform one or more of the processes described above. One will appreciate that one or more computing devices, such as the computing device 1300 may represent the computing devices described above (e.g., the server(s) 102, the annotator client devices 104a-104n, the client device 112, and/or document repository 114). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output ("I/O") interfaces 1308, and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for evaluating and training electronic document annotation models, a method of generating accurate ground-truth digital annotations for digital documents comprising:
   identifying digital annotations generated by client devices of a plurality of annotators for an electronic document;
   determining annotation performance data for the plurality of annotators utilizing annotator interactions corresponding to the electronic document via the client devices of the plurality of annotators, the annotator interactions comprising explored percentages of the electronic document and unexplored percentages of the electronic document for the plurality of annotators determined from scrolling actions within the electronic document;
   generating a final set of digital annotations for the electronic document by filtering the digital annotations based on a comparison between the annotation performance data comprising the explored percentages and the unexplored percentages for the plurality of annotators in relation to the electronic document and one or more threshold performance metrics; and
   providing the final set of digital annotations as ground truth data associated with the electronic document for utilization in at least one of: testing an annotation model or training the annotation model to automatically generate document annotations.

2. The method of claim 1, further comprising:
   identifying a plurality of annotator document topic preferences for the plurality of annotators based on user interactions on the client devices of the plurality of annotators; and
   providing the electronic document to the client devices of the plurality of annotators based on the plurality of annotator document topic preferences.

3. The method of claim 1, wherein:
   the annotation performance data comprises time periods spent by the plurality of annotators in generating the digital annotations; and
   the one or more threshold performance metrics comprises a threshold review time.

4. The method of claim 1, further comprising:
   providing one or more annotation questions to the client devices of the plurality of annotators; and determining the annotation performance data for the plurality of annotators via the client devices based on annotator responses to the one or more annotation questions.

5. The method of claim 4, further comprising:
determining the annotation performance data for the plurality of annotators via the client devices by identifying a number of correct annotator responses from the annotator responses; and
generating the final set of digital annotations by filtering the digital annotations based on the number of correct annotator responses of the plurality of annotators.

6. The method of claim 1, further comprising:
providing a digital question-answer pair user interface to a first client device of a first annotator;
identifying, via the first client device, an annotator digital question and an annotator digital answer of the first annotator generated for the electronic document based on user interactions with the digital question-answer pair user interface;
providing the annotator digital question of the first annotator to a second client device of a second annotator; and
determining an annotator response of the second annotator to the annotator digital question of the first annotator.

7. The method of claim 6, further comprising determining annotation performance data for the second annotator by comparing the annotator response of the second annotator to the annotator digital answer of the first annotator.

8. The method of claim 1, wherein the annotation performance data for the plurality of annotators is based on annotator interactions comprising a scrolling action within the electronic document, a time spent on the electronic document, and a cursor movement on the electronic document.

9. A system comprising:
at least one processor; and
at least one non-transitory computer-readable storage medium storing instructions thereon that, when executed by the at least one processor, cause the system to:
identify a plurality of digital annotations, the plurality of digital annotations comprising one or more digital annotations generated for an electronic document via a client device of an annotator;
provide one or more digital annotation questions corresponding to the electronic document to the client device of the annotator;
determine annotation performance data based on an explored percentage of the electronic document and an unexplored percentage of the electronic document determined from scrolling actions within the electronic document via the client device annotator responses to the one or more digital annotation questions;
generate a final set of digital annotations for the electronic document by filtering the one or more digital annotations based on a comparison between the annotation performance data comprising the explored percentage and the unexplored percentage for the annotator in relation to the electronic document and the annotator responses and one or more threshold performance metrics; and
provide the final set of digital annotations as ground truth data associated with the electronic document for utilization in at least one of: testing an annotation model or training a machine learning model to generate annotations for input electronic documents.

10. The system of claim 9, further comprising instructions that, when executed by the at least one processor, cause the system to:
determine annotator document topic preferences for the annotator based on user interactions by the annotator via the client device; and
provide the electronic document to the client device of the annotator for generating the one or more digital annotations based on the annotator document topic preferences.

11. The system of claim 9, wherein the annotator performance data is further based on a plurality of times spent on a plurality of portions of the electronic document.

12. The system of claim 9, wherein the annotation performance data is further based on annotator interactions comprising a scrolling action within the electronic document, a time spent on the electronic document, and a cursor movement on the electronic document.

13. The system of claim 9, further comprising instructions that, when executed by the at least one processor, cause the system to:
determine the annotation performance data by identifying a number of correct annotator responses from the annotator responses; and
generate the final set of digital annotations by filtering the one or more digital annotations based on a comparison between the number of correct annotator responses and a threshold number of correct annotator responses.

14. The system of claim 9, further comprising instructions that, when executed by the at least one processor, cause the system to:
provide a digital question-answer pair user interface to the client device of the annotator;
identify an annotator digital question and an annotator digital answer of the annotator for the electronic document based on user interactions with the digital question-answer pair user interface;
provide the annotator digital question to a second client device of a second annotator; and
determine the annotation performance data of the annotator based on user interactions from the second client device corresponding to the annotator digital question.

15. The system of claim 14, further comprising instructions that, when executed by the at least one processor, cause the system to:
identify an annotator response of the second annotator to the annotator digital question via the second client device; and
determine the annotation performance data for the annotator by comparing the annotator response of the second annotator to the annotator digital answer of the annotator.

16. The system of claim 9, further comprising instructions that, when executed by the at least one processor, cause the system to provide a digital annotation summary graph for display to an administrator client device, the digital annotation summary graph comprising:
a first axis corresponding to different portions of the electronic document;
a second axis corresponding to a plurality of annotators; and
indicators within the digital annotation summary graph reflecting annotations of the plurality of annotators for the different portions of the electronic document.

17. The system of claim 9, further comprising instructions that, when executed by the at least one processor, cause the system to test the annotation model by:
- generating a plurality of model annotations for the electronic document utilizing the annotation model; and
- comparing the plurality of model annotations with the final set of digital annotations.

18. In a digital medium environment for evaluating and training electronic document annotation models, a non-transitory computer-readable medium storing instructions that, when executed by at least one processor, cause a computer device to:
- identify digital annotations generated by client devices of a plurality of annotators for an electronic document;
- determine annotation performance data for the plurality of annotators utilizing annotator interactions corresponding to the electronic document via the client devices of the plurality of annotators, the annotator interactions comprising explored percentages of the electronic document and unexplored percentages of the electronic document for the plurality of annotators determined from scrolling actions within the electronic document;
- generate a final set of digital annotations for the electronic document by filtering the digital annotations based on a comparison between the annotation performance data comprising the explored percentages and the unexplored percentages for the plurality of annotators in relation to the electronic document and one or more threshold performance metrics; and
- provide the final set of digital annotations as ground truth data associated with the electronic document for utilization in at least one of: testing an annotation model or training the annotation model to automatically generate digital document annotations.

19. The non-transitory computer-readable medium of claim 18, further comprising instructions that, when executed by the at least one processor, cause the computer device to train the annotation model to automatically generate the digital document annotations by:
- providing the electronic document to a machine learning model to predict the digital document annotations;
- comparing the predicted digital document annotations with the final set of digital annotations to generate a calculated loss; and
- training the machine learning model based on the calculated loss.

20. The non-transitory computer-readable medium of claim 19, further comprising instructions that, when executed by the at least one processor, cause the computer device to generate digital document annotations for an additional electronic document utilizing the trained annotation model, wherein the digital document annotations for the additional electronic document comprise highlights within the additional electronic document.

* * * * *